United States Patent
Lian et al.

(10) Patent No.: US 11,159,044 B2
(45) Date of Patent: Oct. 26, 2021

(54) HIERARCHAL FRAMEWORK FOR INTEGRATING DISTRIBUTED ENERGY RESOURCES INTO DISTRIBUTION SYSTEMS

(71) Applicant: Battelle Memorial Institute, Richland, WA (US)

(72) Inventors: Jianming Lian, Richland, WA (US); Karanjit Kalsi, Richland, WA (US); Di Wu, Richland, WA (US); Jacob Hansen, Seattle, WA (US); Trevor D. Hardy, Richland, WA (US); Laurentiu D. Marinovici, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 63 days.

(21) Appl. No.: 16/035,377

(22) Filed: Jul. 13, 2018

(65) Prior Publication Data
US 2019/0020220 A1    Jan. 17, 2019

Related U.S. Application Data

(60) Provisional application No. 62/532,561, filed on Jul. 14, 2017.

(51) Int. Cl.
*H02J 13/00* (2006.01)
*G06Q 50/06* (2012.01)
(Continued)

(52) U.S. Cl.
CPC ......... *H02J 13/0017* (2013.01); *G05B 15/02* (2013.01); *G06Q 50/06* (2013.01); *H02J 3/381* (2013.01); *H02J 13/0086* (2013.01)

(58) Field of Classification Search
CPC .... H02J 13/0017; H02J 3/381; H02J 13/0086; H02J 13/00034; H02J 13/00028;
(Continued)

(56) References Cited

U.S. PATENT DOCUMENTS

| 2,042,187 A | 5/1936 | Powers et al. |
| 4,010,614 A | 3/1977 | Arthur |

(Continued)

FOREIGN PATENT DOCUMENTS

| CA | 2678828 | 3/2010 | |
| EP | 1242932 A1 * | 9/2002 | ............ G06Q 30/06 |

(Continued)

OTHER PUBLICATIONS

Aalami, H.A.; Moghaddam, M.P.; and Yousefi, G.R., "Modeling and Prioritizing Demand Response Programs in Power Markets", Jul. 2, 2009, Electric Power Systems Research, 80, (2010), 426-435. (Year: 2009).*

(Continued)

*Primary Examiner* — Mohammad Ali
*Assistant Examiner* — Kelvin Booker
(74) *Attorney, Agent, or Firm* — Klarquist Sparkman, LLP

(57) ABSTRACT

Methods and apparatus are disclosed for providing a hierarchical framework for integrating distributed energy resources into power distribution systems. In one example of the disclosed technology, a method implemented with an aggregation server includes receiving a respective utility function associated with each of at least two of a plurality of distributed energy resources representing an amount of energy produced or consumed by the respective associated distributed energy resource as a function of energy price, producing an aggregated utility function associated with the plurality of distributed energy resources based on the
(Continued)

received utility functions, transmitting the produced aggregated utility function to a coordinator, receiving a clearing value from the coordinator, and transmitting the received clearing value to each of the plurality of distributed energy resources.

21 Claims, 19 Drawing Sheets

(51) Int. Cl.
*G05B 15/02* (2006.01)
*H02J 3/38* (2006.01)

(58) Field of Classification Search
CPC ... H02J 13/00017; G05B 15/02; G06Q 50/06; Y02E 60/7838; Y02E 60/00; Y02E 40/70; Y04S 40/124; Y04S 10/30; Y04S 10/12
See application file for complete search history.

(56) References Cited

U.S. PATENT DOCUMENTS

| | | | |
|---|---|---|---|
| 4,482,814 A | 11/1984 | Daniels | |
| 4,914,564 A | 4/1990 | Surauer et al. | |
| 5,572,438 A | 11/1996 | Ehlers et al. | |
| 5,684,710 A | 11/1997 | Ehlers et al. | |
| 5,696,695 A | 12/1997 | Ehlers et al. | |
| 5,924,486 A | 7/1999 | Ehlers et al. | |
| 6,021,402 A | 2/2000 | Takriti | |
| 6,047,274 A * | 4/2000 | Johnson | G06Q 10/04 705/412 |
| 6,216,956 B1 | 4/2001 | Ehlers et al. | |
| 6,343,277 B1 | 1/2002 | Gaus et al. | |
| 6,633,823 B2 | 10/2003 | Bartone et al. | |
| 6,681,156 B1 | 1/2004 | Weiss | |
| 6,895,325 B1 | 5/2005 | Munson, Jr. | |
| 6,963,854 B1 | 11/2005 | Boyd et al. | |
| 7,043,380 B2 | 5/2006 | Rodenberg et al. | |
| 7,085,739 B1 | 8/2006 | Winter et al. | |
| 7,130,719 B2 | 10/2006 | Ehlers et al. | |
| 7,135,956 B2 | 11/2006 | Bartone et al. | |
| 7,141,321 B2 | 11/2006 | McArthur et al. | |
| 7,243,044 B2 | 7/2007 | McCalla | |
| 7,249,169 B2 | 7/2007 | Blouin et al. | |
| 7,343,226 B2 | 3/2008 | Ehlers et al. | |
| 7,343,360 B1 | 3/2008 | Ristanovic et al. | |
| 7,379,997 B2 | 5/2008 | Ehlers et al. | |
| 7,395,252 B2 | 7/2008 | Anderson et al. | |
| 7,418,428 B2 | 8/2008 | Ehlers et al. | |
| 7,516,106 B2 | 4/2009 | Ehlers et al. | |
| 7,587,330 B1 | 9/2009 | Shan | |
| 7,599,866 B2 | 10/2009 | Yan et al. | |
| 7,716,101 B2 | 5/2010 | Sandholm et al. | |
| 7,953,519 B2 | 5/2011 | Hamilton, II et al. | |
| 7,996,296 B2 | 8/2011 | Lange | |
| 8,126,794 B2 | 2/2012 | Lange et al. | |
| 8,271,345 B1 | 9/2012 | Milgrom et al. | |
| 8,355,827 B2 | 1/2013 | Egnor et al. | |
| 8,417,391 B1 * | 4/2013 | Rombouts | G06Q 40/04 700/291 |
| 8,478,452 B2 | 7/2013 | Pratt et al. | |
| 8,504,463 B2 | 8/2013 | Johnson et al. | |
| 8,527,389 B2 | 9/2013 | Johnson et al. | |
| 8,577,778 B2 | 11/2013 | Lange et al. | |
| 8,583,520 B1 * | 11/2013 | Forbes, Jr. | G06Q 50/06 705/34 |
| 8,639,392 B2 | 1/2014 | Chassin | |
| 8,892,264 B2 | 11/2014 | Steve et al. | |
| 9,026,473 B2 | 5/2015 | Chassin et al. | |
| 9,087,359 B2 | 7/2015 | Chassin | |
| 9,094,385 B2 | 7/2015 | Akyol et al. | |
| 9,129,337 B2 | 9/2015 | Chassin et al. | |
| 9,240,026 B2 | 1/2016 | Chassin et al. | |
| 9,245,297 B2 | 1/2016 | Chassin et al. | |
| 9,269,108 B2 | 2/2016 | Chassin et al. | |
| 9,342,850 B2 | 5/2016 | Chassin et al. | |
| 9,395,707 B2 | 7/2016 | Anderson et al. | |
| 9,425,620 B2 | 8/2016 | Chassin et al. | |
| 9,589,297 B2 | 3/2017 | Fuller et al. | |
| 9,762,060 B2 | 9/2017 | Kalsi et al. | |
| 9,817,375 B2 | 11/2017 | Li et al. | |
| 10,210,568 B2 | 2/2019 | Lian et al. | |
| 10,498,141 B2 | 12/2019 | Kalsi et al. | |
| 2001/0032029 A1 | 10/2001 | Kauffman | |
| 2002/0038279 A1 | 3/2002 | Samuelson et al. | |
| 2002/0091626 A1 * | 7/2002 | Johnson | G06Q 20/201 705/37 |
| 2002/0103745 A1 | 8/2002 | Lof et al. | |
| 2002/0128747 A1 | 9/2002 | Mima | |
| 2002/0132144 A1 | 9/2002 | McArthur et al. | |
| 2002/0178047 A1 | 11/2002 | Or et al. | |
| 2003/0014379 A1 | 1/2003 | Saias et al. | |
| 2003/0023540 A2 | 1/2003 | Johnson et al. | |
| 2003/0036820 A1 | 2/2003 | Yellepeddy et al. | |
| 2003/0040844 A1 | 2/2003 | Spool et al. | |
| 2003/0040845 A1 | 2/2003 | Spool et al. | |
| 2003/0041002 A1 | 2/2003 | Hao et al. | |
| 2003/0041016 A1 | 2/2003 | Spool et al. | |
| 2003/0041017 A1 | 2/2003 | Spool et al. | |
| 2003/0055774 A1 | 3/2003 | Ginsberg | |
| 2003/0078797 A1 | 4/2003 | Kanbara et al. | |
| 2003/0093332 A1 | 5/2003 | Spool et al. | |
| 2003/0093357 A1 | 5/2003 | Guler et al. | |
| 2003/0139939 A1 | 7/2003 | Spool et al. | |
| 2003/0144864 A1 | 7/2003 | Mazzarella | |
| 2003/0149672 A1 | 8/2003 | Laskoski | |
| 2003/0171851 A1 | 9/2003 | Brickfield et al. | |
| 2003/0210658 A1 | 11/2003 | Hernandez et al. | |
| 2003/0216971 A1 | 11/2003 | Sick et al. | |
| 2004/0010478 A1 | 1/2004 | Peljto et al. | |
| 2004/0015428 A2 | 1/2004 | Johnson et al. | |
| 2004/0024483 A1 | 2/2004 | Holcombe | |
| 2004/0128266 A1 | 7/2004 | Yellepeddy et al. | |
| 2004/0133529 A1 | 7/2004 | Munster | |
| 2004/0140908 A1 | 7/2004 | Gladwin et al. | |
| 2004/0153330 A1 | 8/2004 | Miller et al. | |
| 2004/0225649 A1 | 11/2004 | Yeo et al. | |
| 2004/0254688 A1 | 12/2004 | Chassin et al. | |
| 2005/0015283 A1 | 1/2005 | Tino et al. | |
| 2005/0027636 A1 | 2/2005 | Gilbert et al. | |
| 2005/0065867 A1 | 3/2005 | Aisu et al. | |
| 2005/0096789 A1 * | 5/2005 | Sharma | G05D 23/1931 700/245 |
| 2005/0114255 A1 | 5/2005 | Shields et al. | |
| 2005/0125243 A1 | 6/2005 | Villalobos | |
| 2005/0137959 A1 | 6/2005 | Yan et al. | |
| 2005/0197875 A1 | 9/2005 | Kauffman | |
| 2005/0228553 A1 | 10/2005 | Tryon | |
| 2006/0036357 A1 | 2/2006 | Isono et al. | |
| 2006/0195229 A1 | 8/2006 | Bell et al. | |
| 2006/0241951 A1 | 10/2006 | Cynamom et al. | |
| 2006/0259199 A1 | 11/2006 | Gjerde et al. | |
| 2006/0293980 A1 | 12/2006 | Corby et al. | |
| 2007/0005192 A1 | 1/2007 | Schoettle et al. | |
| 2007/0011080 A1 | 1/2007 | Jain et al. | |
| 2007/0038335 A1 | 2/2007 | McIntyre et al. | |
| 2007/0061248 A1 | 3/2007 | Shavit et al. | |
| 2007/0087756 A1 | 4/2007 | Hoffberg | |
| 2007/0124026 A1 | 5/2007 | Troxell et al. | |
| 2008/0021628 A1 | 1/2008 | Tryon | |
| 2008/0027639 A1 | 1/2008 | Tryon | |
| 2008/0039980 A1 | 2/2008 | Pollack et al. | |
| 2008/0046387 A1 | 2/2008 | Gopal et al. | |
| 2008/0051977 A1 | 2/2008 | Tryon | |
| 2008/0243664 A1 | 10/2008 | Shavit et al. | |
| 2008/0243682 A1 | 10/2008 | Shavit et al. | |
| 2008/0243719 A1 | 10/2008 | Shavit et al. | |
| 2008/0281663 A1 | 11/2008 | Hakim | |
| 2008/0297113 A1 | 12/2008 | Saeki et al. | |
| 2008/0300907 A1 | 12/2008 | Musier et al. | |
| 2008/0300935 A1 | 12/2008 | Musier et al. | |
| 2008/0306801 A1 | 12/2008 | Musier et al. | |
| 2008/0307399 A1 | 12/2008 | Zhou et al. | |

(56) References Cited

U.S. PATENT DOCUMENTS

| | | |
|---|---|---|
| 2008/0319893 A1 | 12/2008 | Mashinsky et al. |
| 2009/0063228 A1 | 3/2009 | Forbes |
| 2009/0132360 A1 | 5/2009 | Arfin et al. |
| 2009/0177591 A1 | 7/2009 | Thorpe et al. |
| 2009/0195349 A1 | 8/2009 | Frader-Thompson et al. |
| 2009/0228151 A1 | 9/2009 | Wang et al. |
| 2009/0307059 A1 | 12/2009 | Young et al. |
| 2009/0313174 A1 | 12/2009 | Hafner et al. |
| 2009/0319090 A1 | 12/2009 | Dillon et al. |
| 2010/0010939 A1 | 1/2010 | Arfin et al. |
| 2010/0049371 A1 | 2/2010 | Martin |
| 2010/0057625 A1 | 3/2010 | Boss et al. |
| 2010/0072817 A1 | 3/2010 | Hirst |
| 2010/0090532 A1 | 4/2010 | Shelton et al. |
| 2010/0106332 A1* | 4/2010 | Chassin ............... G06Q 40/04 700/278 |
| 2010/0106641 A1* | 4/2010 | Chassin ............... G06Q 20/102 705/40 |
| 2010/0107173 A1 | 4/2010 | Chassin |
| 2010/0114387 A1 | 5/2010 | Chassin |
| 2010/0121700 A1 | 5/2010 | Wigder et al. |
| 2010/0138363 A1 | 6/2010 | Batterberry et al. |
| 2010/0179704 A1* | 7/2010 | Ozog ............... H02J 13/0006 700/291 |
| 2010/0179862 A1* | 7/2010 | Chassin ............... H02J 3/008 705/412 |
| 2010/0216545 A1 | 8/2010 | Lange et al. |
| 2010/0217550 A1 | 8/2010 | Crabtree et al. |
| 2010/0218108 A1 | 8/2010 | Crabtree et al. |
| 2010/0256999 A1 | 10/2010 | Ghani et al. |
| 2010/0332373 A1 | 12/2010 | Crabtree et al. |
| 2011/0015801 A1 | 1/2011 | Mazzarella |
| 2011/0016055 A1 | 1/2011 | Mazzarella |
| 2011/0018704 A1 | 1/2011 | Burrows |
| 2011/0029465 A1 | 2/2011 | Ito et al. |
| 2011/0081955 A1 | 4/2011 | Lange et al. |
| 2011/0137835 A1 | 6/2011 | Ito et al. |
| 2011/0231028 A1* | 9/2011 | Ozog ............... G06Q 50/06 700/291 |
| 2011/0301964 A1 | 12/2011 | Conwell |
| 2011/0316480 A1 | 12/2011 | Mills-Price et al. |
| 2012/0022700 A1 | 1/2012 | Drees et al. |
| 2012/0022995 A1 | 1/2012 | Lange |
| 2012/0053011 A1 | 3/2012 | Onomura et al. |
| 2012/0072039 A1 | 3/2012 | Anderson et al. |
| 2012/0072141 A1 | 3/2012 | Hidai et al. |
| 2012/0083930 A1 | 4/2012 | Ilic et al. |
| 2012/0143385 A1 | 6/2012 | Goldsmith |
| 2012/0166616 A1* | 6/2012 | Meehan ............... G06Q 50/06 709/224 |
| 2012/0278220 A1 | 11/2012 | Chassin et al. |
| 2012/0278221 A1 | 11/2012 | Fuller et al. |
| 2013/0015663 A1 | 1/2013 | Kumula et al. |
| 2013/0110304 A1 | 5/2013 | Shiga et al. |
| 2013/0218743 A1 | 8/2013 | Chassin et al. |
| 2013/0218744 A1 | 8/2013 | Chassin et al. |
| 2013/0254090 A1 | 9/2013 | Chassin et al. |
| 2013/0268131 A1 | 10/2013 | Venayagamoorthy et al. |
| 2013/0268132 A1 | 10/2013 | Pratt et al. |
| 2013/0325691 A1 | 12/2013 | Chassin et al. |
| 2013/0325692 A1 | 12/2013 | Chassin et al. |
| 2014/0172503 A1 | 6/2014 | Hammerstrom et al. |
| 2014/0188689 A1* | 7/2014 | Kalsi ............... G06Q 50/06 705/37 |
| 2014/0201018 A1 | 7/2014 | Chassin |
| 2014/0277788 A1* | 9/2014 | Forbes, Jr. ............... G05F 1/66 700/286 |
| 2014/0304025 A1* | 10/2014 | Steven ............... H02J 3/28 705/7.24 |
| 2015/0022007 A1 | 1/2015 | Ma et al. |
| 2015/0111591 A1 | 4/2015 | Hoffberg |
| 2015/0137519 A1 | 5/2015 | Tarnowski |
| 2015/0214738 A1 | 7/2015 | Covic et al. |
| 2015/0379542 A1 | 12/2015 | Lian et al. |
| 2016/0092978 A1 | 3/2016 | Lian et al. |
| 2016/0092986 A1 | 3/2016 | Lian et al. |
| 2016/0105029 A1* | 4/2016 | Sun ............... H02J 3/14 700/287 |
| 2016/0141873 A1* | 5/2016 | Ellice-Flint ............ H02J 3/387 307/20 |
| 2016/0195866 A1 | 7/2016 | Turney et al. |
| 2016/0248255 A1* | 8/2016 | Rive ............... G05B 15/02 |
| 2016/0248260 A1 | 8/2016 | Kulyk et al. |
| 2016/0344188 A1* | 11/2016 | Carlson ............... G05B 15/02 |
| 2017/0005515 A1* | 1/2017 | Sanders ............... H02J 3/14 |
| 2017/0109841 A1* | 4/2017 | Sadikovic ............... H02J 3/382 |
| 2018/0196456 A1* | 7/2018 | ElBsat ............... G06Q 50/06 |
| 2018/0314220 A1* | 11/2018 | Kumar ............... G06Q 30/0283 |
| 2018/0329383 A1 | 11/2018 | Lian et al. |
| 2018/0356770 A1* | 12/2018 | ElBsat ............... G05B 13/021 |
| 2018/0356782 A1* | 12/2018 | ElBsat ............... G06Q 30/0236 |
| 2018/0357577 A1* | 12/2018 | ElBsat ............... G06Q 10/04 |
| 2019/0027933 A1 | 1/2019 | Lian et al. |
| 2019/0155234 A1* | 5/2019 | Devi ............... H04L 67/1002 |
| 2019/0173286 A1* | 6/2019 | Ilic ............... G06Q 40/04 |
| 2019/0181642 A1* | 6/2019 | Cowen, III ............... H02J 3/28 |
| 2019/0206000 A1* | 7/2019 | ElBsat ............... H02J 3/32 |
| 2019/0372345 A1* | 12/2019 | Bain ............... G06Q 30/0601 |
| 2020/0043106 A1* | 2/2020 | Wong ............... G06Q 30/06 |
| 2020/0106269 A1* | 4/2020 | Hannon ............... H02J 3/14 |
| 2020/0139842 A1* | 5/2020 | Logvinov ............... B60L 53/68 |

FOREIGN PATENT DOCUMENTS

| | | | |
|---|---|---|---|
| EP | 2911098 A1 * | 8/2015 | ............ G06Q 10/04 |
| JP | 2008-204073 | 9/2008 | |
| WO | WO 99/01822 | 1/1999 | |
| WO | WO 02/23693 | 3/2002 | |
| WO | WO 2007/065135 | 6/2007 | |
| WO | WO 2013/149076 | 10/2013 | |

OTHER PUBLICATIONS

Ali, M.; Alahaivala, A.; Malik, F.; Humayun, M.; Safdarian, A.; and Lehtonen, M., "A Market-Oriented Hierarchical Framework for Residential Demand Response", Jul. 22, 2014, Electric Power and Energy Systems, 69, (2015), 257-263. (Year: 2014).*

Baek, S.J.; de Veciana, G.; and Su, X., "Minimizing Energy Consumption in Large-Scale Sensor Networks Through Distributed Data Compression and Hierarchical Aggregation", Aug. 2004, IEEE Journal on Selected Areas in Communication, vol. 22, No. 6. (Year: 2004).*

Cappers, P.; MacDonald, J.; Page, J. and Potter, J., "Future Opportunities and Challenges with Using Demand Response as a Resource in Distribution System Operations and Planning Activities", Jan. 2016, Lawrence Berkeley National Laboratory, LBNL-1003951. (Year: 2016).*

Li, N.; Chen, L. and Low, S.H., "Optimal Demand Response Based on Utility Maximization in Power Networks", Jul. 24-28, 2011, IEEE Power and Energy Society General Meeting, DOI: 10.1109/PES.2011.6039082. (Year: 2011).*

Colson, C.M. and Nehrir, M.H., "Algorithms for Distributed Decision-Making for Multi-Agent Microgrid Power Management", Jul. 24-28, 2011, IEEE Power and Energy Society General Meeting, DOI: 10.1109/PES.2011.6039764. (Year: 2011).*

Corneli, S. and Kihm, S., "Electric Industry Structure and Regulatory Responses in a High Distributed Energy Resources Future", Nov. 2015, Berkeley Lab, Report No. 1, LBNL-1003823. (Year: 2015).*

Jiang, B. and Fei, Y., "Dynamic Residential Demand Response and Distributed Generation Management in Smart Microgrid with Hierarchical Agents", Sep. 27-30, 2011, ICSGCE 2011, Energy Procedia, 12, (2011), 76-90, (Year: 2011).*

Jiang, B. and Fei, Y., "Smart Home in Smart Microgrid: A Cost-Effective Energy Ecosystem with Intelligent Hierarchical Agents", Jan. 2015, IEEE Transactions on Smart Grid, vol. 6, No. 1.(Year: 2015).*

(56) References Cited

OTHER PUBLICATIONS

Schwartz et al., "Electricity End Uses, Energy Efficiency and Distributed Energy Resources Baseline", Jan. 2017, Lawrence Berkeley National Laboratory, LBNL-1006983. (Year: 2017).*
Jiankang Wang, "A Demand Responsive Bidding Mechanism with Price Elasticity Matrix in Wholesale Electricity Pools", May 21, 2009, MIT Department of Electrical Engineering and Computer Science in partial fulfillment of the requirements for the degree of Master of Science. (Year: 2009).*
Chua Liang Su, "Optimal Demand-Side Participation in Day-Ahead Electricity Markets", 2007, The University of Manchester for the degree of Doctor of Philosophy In the Faculty of Engineering and Physical Sciences (Year: 2007).*
Larsen et al., "The Cobweb Effect in Balancing Markets with Demand Response", Jan. 29, 2016, European Commission through the project EcoGrid EU (grant ENER/FP7/268199) and by Mogens Balslev's Foundation. (Year: 2016).*
Richard Cowart, "Efficient Reliability, The Critical Role of Demand-Side Resources in Power Systems and Markets", Jun. 2001, The National Association of Regulatory Utility Commissioners (Year: 2001).*
AEP gridSmart demonstration project, Available: http://www.gridsmartohio.com/, Aug. 2013, 1 page.
AEP Ohio power company standard tariff, available at: https://www.aepohio.com/account/bills/rates/AEPOhioRatesTariffsOH.aspx, Issued: Aug. 28, 2015, 187 pages.
Allcott, "Real Time Pricing and Electricity Markets," Harvard University, Feb. 5, 2009, 77 pages.
ANSI/CEA Standard, "Modular Communications Interface for Energy Management," ANSI/CEA-2045, ISO/TEC JTC 1/SC 25 N2152, 98 pages (Feb. 2013).
Akhavan-Hejazi et al., "Challenges and opportunities in large-scale deployment of automated energy consumption scheduling systems in smart grids," in 2012 IEEE Third International Conference on Smart Grid Communications (SmartGridComm). IEEE, 2012, pp. 270-275.
Basar, Lecture Notes on Noncooperative Game Theory, Jul. 26, 2010, 142 pages.
Basso, "IEEE 1547 and 2030 Standards for Distributed Energy Resources Interconnection and Interoperability with the Electricity Grid," a Technical Report published by the National Renewable Energy Laboratory Dec. 2014, 22 pp.
Bejestani, "A dynamic mechanism for wholesale energy market: Stability and robustness," IEEE Transactions on Smart Grid, vol. 5, No. 6, pp. 2877-2888 (Nov. 2014).
Bergen et al., "A Structure Preserving Model for Power System Stability Analysis," IEEE Trans. On Power Apparatus and Systems, pp. 25-35 (Jan. 1981).
Bilgin et al., "Smart building real time pricing for offering load-side regulation service reserves," In 52nd IEEE Conference on Decision and Control, pp. 4341-4348, 2013.
Bishop et al., "Pattern recognition and machine learning," vol. 1, (Springer New York 2006), 703 pages.
Boch, "PJM Interconnection OPENADR 2.0 Advanced Technology Resource Pilot," 5 pages (Dec. 2014).
Borenstein et al., "Diagnosing Market Power in California's Deregulated Wholesale Electricity Market," University of California Energy Institute, Power, PWP-064, 54 pages (Aug. 2000).
Borenstein et al., "Diagnosing Market Power in California's Deregulated Wholesale Electricity Market," University of California Energy Institute, Power, PWP-064, 52 pages (Mar. 2000).
Borenstein et al., "Dynamic Pricing, Advanced Metering, and Demand Response in Electricity Markets," Center for the Study of Energy Markets, 2002, 103 pages.
Boyd et al., "Load Reduction, Demand Response, and Energy Efficient Technologies and Strategies," Pacific Northwest National Laboratory PNNL-18111, 44 pages (Nov. 2008).
Brambley, "Thinking Ahead: Autonomic Buildings," ACEEE Summer Study on the Energy Efficiency in Buildings, vol. 7, pp. 73-86 (2002).
Brooks et al., "Demand Dispatch," IEEE Power and Energy Magazine, vol. 8, No. 3, pp. 20-29 (May 2010).
Burke et al., "Robust Control of Residential Demand Response Network with Low Bandwidth Input," In Proceedings of Dynamic Systems and Control Conference, American Society of Mechanical Engineers, pp. 413-415, Oct. 20-22, 2008.
Cai et al., "Economic Dispatch in Microgrids Using Multi-Agent System," In North American Power Grid Symposium (NAPS), Sep. 2012, 5 pages.
Callaway et al., "Achieving Controllability of Electric Loads," Proc. IEEE, vol. 99, No. 1, pp. 184-199 (Jan. 2011).
Callaway, "Tapping the Energy Storage Potential in Electric Loads to Deliver Load Following and Regulation, with Application to Wind Energy," Energy Conversion and Management, vol. 50, No. 5, pp. 1389-1400 (May 2009).
Chandley, "How RTOs Set Spot Market Prices (And How It Helps Keep the Lights On)," PJM Interconnection, 23 pages (Sep. 2007).
Chang et al., "Modeling and Control of Aggregated Air Conditioning Loads Under Realistic Conditions," 2013 IEEE PES Innovative Smart Grid Technologies (ISGT), Feb. 2013, 6 pages.
Chao, "Price-Responsive Demand Management for a Smart Grid World," Electr. J., vol. 23, No. 1, pp. 7-20 (2010).
Chassin et al., "Decentralized Coordination through Digital Technology, Dynamic Pricing, and Customer-Driven Control: The GridWise Testbed Demonstration Project," The Electricity Journal, vol. 21, pp. 51-59 (Oct. 2008).
Chassin et al., "Gauss-Seidel Accelerated: Implementing Flow Solvers on Field Programmable Gate Arrays," IEEE Power Engineering Society General Meeting, 5 pages (Jun. 2006).
Chassin et al., "Gridlab-d: An agent-based simulation framework for smart grids," Journal of Applied Mathematics, vol. 2014, No. 492320, 12 pages (Jun. 2014).
Chassin et al., "GridLAB-D: An Open-source Power Systems Modeling and Simulation Environment," IEEE, 5 pages (Apr. 2008).
Chassin, "GridLAB-D Technical Support Document: Tape Modules Version 1.0," Pacific Northwest National Laboratory PNNL-17614, 8 pages (May 2008).
Chassin, "GridLAB-D Technical Support Document: Commercial Modules Version 1.0," Pacific Northwest National Laboratory PNNL-17615, 8 pages (May 2008).
Chassin, "GridLAB-D Technical Support Document: Network Module Version 1.0," Pacific Northwest National Laboratory PNNL-17616, 10 pages (May 2008).
Chassin et al., "Load Modeling and Calibration Techniques for Power System Studies," North American Power Symp., 7 pages (Aug. 2011).
Chassin et al., "Modeling Power Systems as Complex Adaptive Systems," Pacific Northwest National Laboratory PNNL-14987, 151 pages (Dec. 2004).
Chassin et al., "Project 2.6—Enhancement of the Whole-Building Diagnostician," Pacific Northwest National Laboratory PNNL-14383, 17 pages (Aug. 2003).
Chassin, "The Abstract Machine Model for Transaction-based System Control," Pacific Northwest National Laboratory PNNL-14082, 28 pages (Nov. 2002).
Chassin, "Statistical Mechanics: A Possible Model for Market-based Electric Power Control", Proc. of the 37th Hawaii Int'l Conf. on System Sciences, 10 pages (Janury 2004).
Chassin et al., "The Pacific Northwest Demand Response Market Demonstration," IEEE, 6 pages (Jul. 2008).
Chen et al., "The Influence of Topology Changes on Inter-area Oscillation Modes and Mode Shapes," IEEE Power and Energy Society General Meeting, 7 pages (Jul. 2011).
Chen et al., "Real-time power control of data centers for providing regulation service," In 52nd IEEE Conference on Decision and Control, Dec. 10-13, 2013, pp. 4314-4321.
Chen et al., "Two Market Models for Demand Response in Power Networks," In Proceedings of 2010 First IEEE International Conference on Smart Grid Communications (SmartGridComm), Oct. 4-6, 2010, pp. 397-402.

(56) References Cited

OTHER PUBLICATIONS

Chow et al., "A Toolbox for Power System Dynamics and Control Engineering Education and Research," IEEE Trans. On Power Systems, vol. 7, No. 4, pp. 1559-1564 (Nov. 1992).
Chow et al., "Power System Toolbox, Version 3.0," 123 pages (2008).
Ciraci et al., "FN CS: a framework for power system and communication networks co-simulation," Proceedings of the Symposium on Theory of Modeling and Simulation—DEVS Integrative, Article No. 36 (Apr. 2014).
Clearwater et al., "Thermal Markets for Controlling Building Environments," Energy Engineering, vol. 91, No. 3, pp. 26-56 (1994).
Collins, "Error Analysis in Scanned Holography," Oregon State University, Ph.D. thesis, Jun. 1970, 110 pages.
Conejo et al., "Price-Taker Bidding Strategy Under Price Uncertainty," IEEE Transactions on Power Systems, vol. 17, No. 4, Nov. 2002, pp. 1081-1088.
Cong et al., "FlowMap: An Optimal Technology Mapping Algorithm for Delay Optimization in Lookup-Table Based FPGA Designs," IEEE Transactions on Computer-Aided Design of Integrated Circuits and Systems, vol. 13, No. 1, Jan. 1994, 12 pages.
Daily et al., "Framework for Network Co-Simulation," Workshop on Next-Generation Analytics for the Future Power Grid, PowerPoint presentation, 20 pages (Jul. 2014).
Dalkilic et al., "Randomized pricing for the optimal coordination of opportunistic agents," in 2014 52nd Annual Allerton Conference on Communication, Control, and Computing (Allerton. IEEE, 2014, pp. 491-498.
De Ladurantaye et al., "Strategic Bidding for Price-Taker Hydroelectricity Producers," IEEE Transactions on Power Systems, vol. 22, No. 4, pp. 2187-2203 (Nov. 2007).
Denholm et al., "An Evaluation of Utility System Impacts and Benefits of Optimally Dispatched Plug-In Hybrid Electric Vehicles," NREL Technical Report NREL/TP-620-40293, 30 pages (Oct. 2006).
Denton et al., "Spot Market Mechanism Design and Competitivity Issues in Electric Power," Proc. of the 31st Hawaii International Conference on System Sciences, vol. 3, pp. 48-56 (Jan. 1998).
Diao et al., "Deriving Optimal Operational Rules for Mitigating Inter-area Oscillations," IEEE/PES Power Systems Conference & Exposition, 8 pages (Mar. 2011).
Diao et al., "Electric Water Heater Modeling and Control Strategies for Demand Response," Power and Energy Society General Meeting, 8 pages (Jul. 2012).
Dominguez-Garcia et al., "Resilient Networked Control of Distributed Energy Resources," IEEE Journal on Selected Areas in Communications, vol. 30, No. 6, Jul. 2012, pp. 1137-1148.
Donnelly et al., "Autonomous Demand Response for Primary Frequency Regulation," PNNL-21152, 69 pages (Jan. 2012).
Dorfler et al., "Synchronization in Complex Oscillator Networks: A Survey," Automatica, vol. 50, No. 6, pp. 1539-1564 (Jun. 2014).
Driesen et al., "Design for Distributed Energy Resources," IEEE Power & Energy Magazine, vol. 6, No. 3, pp. 30-40, May/Jun. 2008.
Dufresne et al., "Cobweb Theorems with Production Lags and Price Forecasting," Economics E-Journal, Jan. 2012, 27 pp.
Electric Power Research Institute, "IntelliGrid—Program 161," 2014 Research Portfolio, 23 pages (downloaded Dec. 2014).
Electric Reliability Council of Texas, Inc., "Glossary," 59 pages (document not dated—downloaded on Jul. 10, 2015).
Ellison et al., "Project Report: A Survey of Operating Reserve Markets in U.S. ISO/RTO-managed Electric Energy Regions," SAND2012-1000, Sandia National Laboratories, 44 pages (Sep. 2012).
Energy Star, "Energy Star® Program Requirements—Product Specification for Residential Refrigerators and Freezers, Eligibility Criteria," Version 5.0, 10 pages (Sep. 2014).
Ezekiel, "The Cobweb Theorem," The Quarterly Journal of Economics, vol. 52, No. 2, pp. 255-280 (Feb. 1938).
Fahrioglu et al., "Designing Incentive Compatible Contracts for Effective Demand Management," IEEE Transactions on Power Systems, vol. 15, No. 4, Nov. 2000, pp. 1255-1260.
Farhangi, "The Path of the Smart Grid," IEEE Power & Energy Magazine, vol. 8, No. 1, pp. 18-28, Jan./Feb. 2010.
Farivar et al., "Branch flow model: Relaxations and convexification—Part I," IEEE Trans. Power Syst., vol. 28, No. 3, pp. 2554-2564, Aug. 2013.
Farivar et al., "Equilibrium and dynamics of local voltage control in distribution systems," in Proc. IEEE Conf. Decision Control, Florence, Italy, Dec. 2013, pp. 4329-4334.
Faruqui et al., "The impact of informational feedback on energy consumption—A survey of the experimental evidence," Energy, vol. 35, No. 4, 2010, pp. 1598-1608.
Feigenbaum et al., "Distributed Algorithmic Mechanism Design: Recent Results and Future Directions," In Proceedings of the 6th International Workshop on Discrete Algorithms and Methods for Mobile Computing and Communications, Sep. 2002, 13 pages.
Fernandez et al., "Self Correcting HVAC Controls: Algorithms for Sensors and Dampers in Air-Handling Units," Pacific Northwest Laboratory PNNL-19104, 49 pages (Dec. 2009).
Francis et al., "Chortle-erf: Fast Technology Mapping for Lookup Table-Based FPGAs," 28th ACM/IEEE Design Automation Conference, Jun. 21, 1991, pp. 227-233.
Fuller et al., "Analysis of Residential Demand Response and Double-Auction Markets," IEEE Power and Energy Society General Meeting, 7 pages (Jul. 2011).
Fuller et al., "Communication Simulations for Power System Applications," Modeling and Simulation of Cyber-Physical Energy Systems Workshop, 6 pages (May 2013).
QaFuller et al., "Evaluation of Representative Smart Grid Investment Grant Project Technologies: Demand Response," Pacific Northwest National Laboratory PNNL 20772, 349 pages (Feb. 2012).
Fuller et al., "Modeling of GE Appliances: Cost Benefit Study of Smart Appliances in Wholesale Energy, Frequency Regulation, and Spinning Reserve Markets," PNNL-22128, 64 pages (Dec. 2012).
Fuller et al., "Modeling of GE Appliances in GridLAB-D: Peak Demand Reduction," Pacific Northwest National Laboratory PNNL-21358, 157 pages (Apr. 2012).
Gan et al., "Convex relaxations and linear approximation for optimal power flow in multiphase radial networks," in Proc. 2014 Power Systems Computation Conference, Wrocaw, Poland, Aug. 2014.
Gan et al., "Exact convex relaxation of optimal power flow in radial networks," IEEE Trans. Autom. Control, vol. 60, No. 1, pp. 72-87, Jan. 2015.
Gatterbauer, "Interdependencies of Electricity Market Characteristics and Bidding Strategies of Power Producers," Master's Thesis, Massachusetts Institute of Technology, 33 pages (May 2002).
GE Energy Consulting, "PSLF—Get It Done Faster with PSLF!," downloaded from the World Wide Web, 2 pages (2013).
Georgilakis, "Market Clearing Price Forecasting in Deregulated Electricity Markets Using Adaptively Trained Neural Networks," Hellenic Conference on Artificial Intelligence, vol. 3955, pp. 56-66 (2006).
Gjerstad et al., "Price Formation in Double Auctions," Games and Economic Behavior, vol. 22, article No. GA970576, pp. 1-29 (1998), document marked as "Received Nov. 30, 1995".
Goldberg et al., "Measurement and Verification for Demand Response," 123 pages (Feb. 2013).
Gomez et al., "Learning price-elasticity of smart consumers in power distribution systems," in 2012 IEEE Third International Conference on Smart Grid Communications (SmartGridComm), IEEE, 2012, pp. 647-652.
Green Car Congress, "PG&E and Tesla to Research Smart Recharging Vehicle-to-Grid Technology," downloaded from http://www.greencarcongress.com/2007/09/pge-and-tesla-t.html, 3 pages (Sep. 12, 2007).
GridLAB-D residential module user's guide, Available: http://sourceforeg.net/apps/mediawiki/gridlab-d, last modified on Oct. 22, 2013, 24 pages.
Gridwise Architecture Council, "Transactive Energy Workshop Proceedings," PNNL-SA-86105, 24 pages (May 2011).

(56) References Cited

OTHER PUBLICATIONS

Guttromson et al., "Residential Energy Resource Models for Distribution Feeder Simulation," IEEE, vol. 1, pp. 108-113 (Jul. 2003).
Hadley et al., "AMI Communication Requirements to Implement Demand-Response: Applicability of Hybrid Spread Spectrum Wireless," Pacific Northwest National Laboratory, Tech. Rep. PNNL-20806, 13 pages (Sep. 2011).
Hammerstrom et al., "Pacific Northwest GridWise Testbed Demonstration Projects: Part I. Olympic Peninsula Project," Pacific Northwest National Laboratory PNNL-17167, 157 pages (Oct. 2007).
Hammerstrom et al., "Pacific Northwest GridWise Testbed demonstration Projects: Part II. Grid Friendly Appliance Project," Pacific Northwest National Laboratory PNNL-17079, 123 pages (Oct. 2007).
Hammerstrom et al., "Standardization of a Hierarchical Transactive Control System," Grid Interop Conf., 7 pages (Nov. 2009).
Hammerstrom et al., "Standardization of a Hierarchical Transactive Control System," Grid Interop Conf., PowerPoint presentation slides, 19 pages (Nov. 2009).
Han et al., "Development of an Optimal Vehicle-to-Grid Aggregator for Frequency Regulation," IEEE Transactions on Smart Grid, vol. 1, No. 1, Jun. 2010, pp. 65-72.
Hansen et al., "Evaluating transactive controls of integrated transmission and distribution systems using the Framework for Network Co-Simulation," in 2017 American Control Conference (Acc. IEEE, 2017), pp. 4010-4017 (May 2017).
Hansen et al., "Transactive Energy: Stabilizing Oscillations in Integrated Wholesale-Retail Energy Markets" IEEE PES Transactions on Power Systems, VXX, No. X, Oct. 2017, 9 pages.
Hao et al., "Aggregate Flexibility of Thermostatically Controlled Loads," IEEE Transactions on Power Systems, vol. 30, No. 1, Jan. 2015, pp. 189-198.
Hao et al., "Ancillary Service for the Grid via Control of Commercial Building HVAC Systems," In 2013 American Control Conference, IEEE, Jun. 17-19, 2013, pp. 467-472.
Hao et al., "How Demand Response from Commercial Buildings Will Provide the Regulation Needs of the Grid," 50th Annual Allerton Conf., 6 pages (Oct. 2012).
Hao et al., "Transactive Control of Commercial Buildings for Demand Response," IEEE Transactions on Power Systems, vol. 32, No. 1, pp. 774-783, 2017.
Hatley et al., "Energy Management and Control System: Desired Capabilities and Functionality," Pacific Northwest National Laboratory PNNL-15074, 46 pages (Apr. 2005).
He et al., "Supply and demand in smart grid: A closed-loop pricing strategy," in 2015 54th IEEE Conference on Decision and Control (IEEE, 2015), pp. 6004-6009.
Hill et al., "Stability Analysis of Multimachine Power Networks with Linear Frequency Dependent Loads," IEEE Trans. On Circuits and Systems, vol. 29, No. 12, pp. 840-848 (Dec. 1982).
Hô et al., "Econophysical Dynamics of Market-Based Electric Power Distribution Systems," IEEE, pp. 1-6 (Jan. 2006).
Holmes, "Using AMI Data for DR M&V Webcast," EPRI Powerpoint presentation, 21 pages (May 2013).
Hsu et al., "Dispatch of Direct Load Control Using Dynamic Programming," IEEE Transactions on Power Systems, vol. 6, No. 3, Aug. 1991, pp. 1056-1061.
Huang et al., "Analytics and Transactive Control Design for the Pacific Northwest Smart Grid Demonstration Project," IEEE Int'l Conf. on Smart Grid Communications, pp. 449-454 (Oct. 2010).
Huang et al., "MANGO—Modal Analysis for Grid Operation: A Method for Damping Improvement through Operating Point Adjustment," Pacific Northwest National Laboratory PNNL-19890, 92 pages (Oct. 2010).
Huang et al., "Transforming Power Grid Operations," Scientific Computing, vol. 45, No. 5, pp. 22-27 (Apr. 2007).
Huberman et al., "A Multi-Agent System for Controlling Building Environments," In Proceedings of the First International Conference on Multiagent Systems, Jun. 12-14, 1995, pp. 171-176.

Hug et al., "Consensus + innovations approach for distributed multiagent coordination in a microgrid," IEEE Trans. Smart Grid, vol. 6, No. 4, pp. 1893-1903, Jul. 2015.
Human Solutions, "Anthroscan—System Solution for Serial Measurements" [undated], 4 pages.
Hurwicz, "The Design of Mechanisms for Resource Allocation," In The American Economic Review, Papers and Proceedings of the Eighty-fifth Annual Meeting of the American Economic Association, vol. 63, No. 2, May 1973, 31 pages.
"IEEE P1547.8 Recommended Practice for Establishing Methods and Procedures that Provide Supplemental Support for Implementation Strategies for Expanded Use of IEEE Standard 1547," retrieved Feb. 11, 2019 from http://grouper.ieee.org/groups/scc21/1547.8/1547.8_index.html, 1 p.
International Search Report dated Mar. 4, 2011, from International Patent Application No. PCT/US2010/020803, 4 pages.
International Search Report dated Nov. 28, 2012, from International Patent Application No. PCT/US2012/034559, 3 pages.
International Search Report and Written Opinion dated Jul. 25, 2016, from International Patent Application No. PCT/US2016/028901, 10 pages.
Kakhbod et al., "Power Allocation and Spectrum Sharing in Wireless Networks: An Implementation Theory Approach," Mechanisms and Games for Dynamic Spectrum Allocation (Chapter 5), Feb. 2014, 42 pages.
Kabalci, "A survey on smart metering and smart grid communication," Renewable and Sustainable Energy Reviews, vol. 57, pp. 302-318, May 2016.
Kalsi et al., "Distributed Smart Grid Asset Control Strategies for Providing Ancillary Services," PNNL-22875, 46 pages (Sep. 2013).
Kalsi et al., "Loads as a Resource: Frequency Responsive Demand," PNNL SA-23764, 52 pages (Sep. 2014).
Kannberg et al., "GridWise: The Benefits of a Transformed Energy System," Pacific Northwest National Laboratory PNNL-14396, 48 pages (Sep. 2003).
Kar et al., "Distributed Robust Economic Dispatch in Power Systems: A Concensus + Innovations Approach," In Proc. IEEE Power and Energy Society General Meeting, Jul. 2012, 8 pages.
Katipamula et al., "Evaluation of Residential HVAC Control Strategies for Demand Response Programs," ASHRAE Trans., Symp. on Demand Response Strategies for Building Systems, 12 pp (Jan. 2006).
Katipamula et al., "Transactive Controls: A Market-Based GridWise Controls for Building Systems," Pacific Northwest National Laboratory PNNL-15921, 14 pages (Jul. 2006).
Kersting, "Radial Distribution Test Feeders," IEEE Transactions on Power Systems, vol. 6, No. 3, pp. 975-985, Aug. 1991.
Kiesling, "Retail Electricity Deregulation: Prospects and Challenges for Dynamic Pricing and Enabling Technologies," The Searle Center Annual Review of Regulation, 44 pages (May 2007).
Kim et al., "Scheduling Power Consumption With Price Uncertainty," IEEE Transactions on Smart Grid, vol. 2, No. 3, Sep. 2011, pp. 519-527.
Kintner-Meyer et al., "Final Report for the Energy Efficient and Affordable Small Commercial and Residential Buildings Research Program—Project 3.3—Smart Load Control and Grid Friendly Appliances," Pacific Northwest National Laboratory PNNL-14342, 147 pages (Jul. 2003).
Koch et al., "Modeling and Control of Aggregated Heterogeneous Thermostatically Controlled Loads for Ancillary Services," Proc. Power Systems Computation Conference, 8 pages (Aug. 2011).
Kok et al., "Agent-based Electricity Balancing with Distributed Energy Resources, A Multiperspective Case Study," Proc. Hawaii Int'l Conf. on System Sciences, 10 pages (Jan. 2008).
Kok et al., "Dynamic Pricing by Scalable Energy Management Systems—Field Experiences and Simulation Results using Powermatcher," In IEEE Power and Energy Society General Meeting, Jul. 2012, 8 pages.
Kok et al., "Intelligence in Electricity Networks for Embedding Renewables and Distributed Generation," In Intelligent infrastructures, Springer, 2010, pp. 179-209.
Kok et al., "PowerMatcher: Multiagent Control in the Electricity Infrastructure," AAMAS, 8 pages (Jul. 2005).

(56) References Cited

OTHER PUBLICATIONS

Kundu et al., "Modeling and Control of Thermostatically Controlled Loads," Power Systems Computation Conference, 7 pages (Aug. 2011).
Larsen et al., "The Cobweb Effect in Balancing Markets with Demand Response," In Proceedings of European Electrical Market Conference 2015 IEEE, 9 pages (2015).
Lasseter et al., "Integration of Distributed Energy Resources. The CERTS MicroGrid Concept," Lawrence Berkeley National Laboratory, Oct. 2013, 32 pages.
LeMay et al., "An Integrated Architecture for Demand Response Communications and Control," Hawaii Int'l Conf. on System Sciences, 10 pages (Jan. 2008).
Li et al., "Integrated Power Management of Data Centers and Electric Vehicles for Energy and Regulation Market Participation," IEEE Transactions on Smart Grid, vol. 5, No. 5, Sep. 2014, pp. 2283-2294.
Li et al., Market-Based Coordination of Thermostatically Controlled Loads—Part I: Mechanism Design Formulation, IEEE Transactions on Power System, under review, Mar. 15, 2015, 11 pages.
Li et al., Market-Based Coordination of Thermostatically Controlled Loads—Part II: Unknown Parameters and Case Studies, IEEE Transactions on Power System, has been accepted for inclusion in a future issue, 9 pages.
Li et al., "A Market Mechanism Design Approach for Coordination of Thermostatically Controlled Loads With Unknown Parameters (Part I)," IEEE Transactions on Power System, 2014, 8 pages.
Li et al., "A Market Mechanism Design Approach for Coordination of Thermostatically Controlled Loads With Unknown Parameters (Part II)," IEEE Transactions on Power System, 2014, 8 pages.
Li et al., "A Mechanism Design Approach for Coordination of Thermostatically Controlled Loads," Available at http://arxiv.org/abs/1503.02705, last updated Jun. 15, 2015, 16 pages.
Li et al., "Optimal Demand Response Based on Utility Maximization in Power Networks," In Power and Energy Society General Meeting, IEEE, Jul. 24-29, 2011, 8 pages.
Lian et al., "Distributed Hierarchical Control of Multi-area Power Systems with Improved Primary Frequency Regulation," IEEE Annual Conf. on Decision and Control, pp. 444-449 (Dec. 2012).
Lian et al., "Theoretical Framework for Integrating Distributed Energy Resources into Distribution Systems," undated paper presented on behalf of Pacific Northwest National Laboratory and The Ohio State University, 5 pp.
Liu et al., "Planning and Control of Electric Vehicles Using Dynamic Energy Capacity Models," In 52nd Annual Conference on Decision and Control (CDC), IEEE, Dec. 10-13, 2013, pp. 379-384.
Ljung, System Identification: Theory for the User, 255 pages (Prentice Hall 1987).
Lu et al., "A State-Queueing Model of Thermostatically Controlled Appliances," IEEE Trans, on Power Systems, vol. 19, No. 3, pp. 1666-1673 (Aug. 2004).
Lu et al., "An Evaluation of the HVAC Load Potential for Providing Load Balance Service," IEEE Transactions on Smart Grid, vol. 3, No. 3, Sep. 2012, pp. 1263-1270.
Lu et al., "Control Strategies of Thermostatically Controlled Appliances in a Competitive Electricity Market," IEEE Proc. Power Engineering Society General Meeting, pp. 202-207 (Jun. 2005).
Lu et al., "Design Considerations for Frequency Responsive Grid Friendly Appliances," IEEE PES Trans. and Distribution Conference and Exhibition, 6 pages (May 2006).
Lu et al., "Grid Friendly Device Model Development and Simulation," Pacific Northwest National Laboratory PNNL-18998, 52 pages (Nov. 2009).
Lu et al., "Modeling Uncertainties in Aggregated Thermostatically Controlled Loads Using a State Queueing Model," IEEE Trans. on Power Systems, vol. 20, No. 2, pp. 725-733 (May 2005).
Lu et al., "Reputation-Aware Transaction Mechanisms in Grid Resource Market," IEEE Sixth Int'l Conf. on Grid and Cooperative Computing, 6 pages (Aug. 2007).
Lu et al., "Simulating Price Responsive Distributed Resources," IEEE, vol. 3, pp. 1538-1543 (Oct. 2004).
Lundstrom "An Advanced Platform for Development and Evaluation of Grid Interconnection Systems Using Hardware-In-The-Loop", © Blake R. Lundstrom, 2013, 149 pp.
Ma, et al., "Dynamics of electricity markets with unknown utility functions: An extremum seeking control approach," in 2014 11th IEEE International Conference on Control & Automation (ICCA), 2014, pp. 302-307.
Marinovici et al., "Distributed Hierarchical Control Architecture for Transient Dynamics Improvement in Power Systems," IEEE Trans. On Power Systems, vol. 28, No. 3, pp. 3065-3074 (2013).
Marion et al., "User's Manual for TMY2s: Typical Meteorological Years: Derived from the 1961-1990 National Solar Radiation data Base," National Renewable Energy Laboratory, Jun. 1995, 55 pages.
Mas-Colell et al., "Microeconomic Theory," (Oxford University Press 1995), 501 pages.
Maskin, "Mechanism Design: How to Implement Social Goals," In Les Prix Nobel 2007, pp. 296-307 (2008).
Mathieu et al., "Residential Demand Response program design: Engineering and economic perspectives," in 11th International Conference on the European Energy Market. IEEE, 2013, pp. 1-8.
Mathieu et al., "State Estimation and Control of Electric Loads to Manage Real-Time Energy Imbalance," IEEE Trans. on Power Systems, vol. 28, No. 1, pp. 430-440 (Feb. 2013).
Meadows, "The dynamics of commodity production cycles: a Dynamic Cobweb Theorem." Ph.D. dissertation, Massachusetts Institute of Technology, 174 pages (1969).
Melton, "A Transactive Control Approach to Engaging Responsive Assets," Connectivity Week, PowerPoint presentation slides, 14 pages (May 2010).
Melton et al., "Transactive Energy: Envisioning the Future," IEEE Electrification Magazine, vol. 4, No. 4, pp. 2-3, 2016.
Melton et al., "Transactive Control: An Approach for Widespread Coordination of Responsive Smart Grid Assets," Pacific Northwest Smart Grid Demonstration Project PowerPoint presentation slides, 19 pages (May 2010).
Melton, "Transactive Control in Electricity Delivery," Grid-Interop 2010, Pacific Northwest Smart Grid Demonstration Project, PowerPoint presentation slides, 15 pages (Nov. 2010).
Melton, "Using Transactive Control to Engage Distributed Energy Resources," Connectivity Week, PowerPoint presentation slides, 10 pages (May 2011).
Moeslund, et al., "A Survey of Computer Vision-Based Human Motion Capture," Computer Vision and Image Understanding, vol. 81, No. 3, Mar. 2001, pp. 231-268.
Mohsenian-Rad et al., "Optimal Residential Load Control With Price Prediction in Real-Time Electricity Pricing Environments," IEEE Transactions on Smart Grid, vol. 1, No. 2, Sep. 2010, pp. 120-133.
Molina-Garcia et al., "Decentralized Demand-side Contribution to Primary Frequency Control," IEEE Trans. On Power Systems, vol. 26, No. 1, pp. 411-419 (Feb. 2011).
Moya et al., "A Hierarchical Framework for Demand-Side Frequency Control," American Control Conference, pp. 52-57 (Jun. 2014).
Moya et al., "A Hierarchical Framework for Demand-Side Frequency Control," American Control Conference, PowerPoint presentation, 65 pages (Jun. 2014).
Nanduri et al., "A Methodology for Evaluating Auction Based Pricing Strategies in Deregulated Energy Markets," Working Paper, 12 pages (2005).
Nanduri, et al., "A Reinforcement Learning Model to Assess Market Power Under Auction-Based Energy Pricing," IEEE Trans. on Power Systems, vol. 22, No. 1, pp. 85-95 (Feb. 2007).
Narang et al., "IEEE Smart Grid Tutorial", an IEEE Presentation dated Jan. 18, 2018, 31 pp.
Nguyen et al., "Optimal Bidding Strategy for Microgrids Considering Renewable Energy and Building Thermal Dynamics," IEEE Transactions on Smart Grid, vol. 5, No. 4, Jul. 2014, pp. 1608-1620.

(56) References Cited

OTHER PUBLICATIONS

Nicolaisen et al., "Market Power and Efficiency in a Computational Electricity Market With Discriminatory Double-Auction Pricing," ISU Economic Report No. 52, 26 pages (Aug. 27, 2000; revised Aug. 24, 2001).
Ns-3 Network Simulator, ns-3 Manual, Release ns-3.16, 126 pages (Dec. 2012).
Ntakou et al., "Price Discovery in Dynamic Power Markets with Low-Voltage Distribution-Network Participants," In IEEE Transmission and Distribution Conference and Exposition, Apr. 14-17, 2014, 5 pages.
O'Neill et al., "Model-Based Thermal Load Estimation in Buildings," Fourth National Conference of IBPSA-USA, Aug. 2010, 9 pages.
Pacific Northwest National Laboratory, "GridLAB-D—A Unique Tool to Design the Smart Grid," PNNL-SA-92325, 4 pages (Nov. 2012).
Palensky et al., "Demand Side Management: Demand Response, Intelligent Energy Systems, and Smart Loads," IEEE Transactions on Industrial Informatics, vol. 7, No. 3, Aug. 2011, pp. 381-388.
Pantoja et al., "Dispatch of Distributed Generators under Local-Information Constraints," In 2014 American Control Conference (ACC), Jun. 4-6, 2014, pp. 2682-2687.
Parkes, "Iterative Combinatorial Auctions: Achieving Economic and Computational Efficiency," PhD thesis, University of Pennsylvania, 2000, 115 pages.
Paschalidis et al., "Demand-Side Management for Regulation Service Provisioning Through Internal Pricing," IEEE Transactions on Power System, vol. 27, No. 3, Aug. 2012, pp. 1531-1539.
Pedrasa et al., "Coordinated Scheduling of Residential Distributed Energy Resources to Optimize Smart Home Energy Services," IEEE Transactions on Smart Grid, vol. 1, No. 2, Sep. 2010, pp. 134-143.
PJM Interconnection, "Description of Regulation Signals," downloaded from the World Wide Web, 1 p. (document not dated—downloaded on Jul. 14, 2015).
PJM Interconnection, "Markets & Operations," downloaded from the World Wide Web, 3 pages (document not dated—downloaded on Jul. 14, 2015).
PJM Interconnection, Regulation Performance Senior Task Force, "Performance Based Regulation: Year One Analysis," 22 pages (Oct. 2013).
PJM wholesale market energy price, available at: http://www.pjm.com/markets-and-operations/energy.aspx, uploaded Sep. 16, 2015, 3 pages.
Plott et al., "Instability of Equilibria in Experimental Markets: Upward-sloping Demands, Externalities, and Fad-like Incentives," Southern Economic Journal, vol. 65 (3), 23 pages (Jan. 1999).
Pourebrahimi et al., "Market-based Resource Allocation in Grids," IEEE Int'l Conf. on e-Science and Grid Computing, 8 pages (2006).
Power World Corporation, "Simulator Version 14, User's Guide," 1517 pages (2009).
Pratt et al., "Description of Electric Energy Use in Single-Family Residences in the Pacific Northwest," Pacific Northwest National Laboratory, Tech. Rep., 510 pages (1989).
Pratt et al., "Potential Impacts of High Penetration of Plug-in Hybrid Vehicles on the U.S. Power Grid," DOE/EERE PHEV Stakeholder Workshop, 14 pages (Jun. 2007).
Price et al., "Reduced network modeling of WECC as a market design prototype," in Energy Society General Meeting. IEEE, 2011, pp. 1-6.
Rahimi et al., "Demand Response as a Market Resource Under the Smart Grid Paradigm," IEEE Transactions on Smart Grid, vol. 1, No. 1, Jun. 2010, pp. 82-88.
Rasouli et al., "Electricity Pooling Markets with Strategic Producers Possessing Asymmetric Information I: Elastic Demand," arXiv: 1401.4230, Jan. 17, 2014, 8 pages.
Reiter, "Information Incentive and Performance in the (new) Welfare Economics," reprinted from American Economic Review, vol. 67, No. 1, Feb. 1977, 27 pages.

"Residential module user's guide." [Online]. Available: http://gridlabd.sourceforge.net/wiki/index.php/Residential module user's guide.
Robbins et al., "Optimal tap setting of voltage regulation transformers in unbalanced distribution systems," IEEE Trans. Power Syst., vol. 31, No. 1, pp. 256-267, Jan. 2016.
Roozbehani et al., "Dynamic Pricing and Stabilization of Supply and Demand in Modem Electric Power Grids," in 2010 1st IEEE International Conference on Smart Grid Communications (SmartGridComm). IEEE, 2010, pp. 543-548.
Roozbehani et al., "Volatility of Power Grids Under Real-Time Pricing," IEEE Transactions on Power Systems, vol. 27, No. 4, pp. 1926-1940 (2012).
Sage et al., Estimation Theory with Applications to Communications and Control, 540 pages (1971).
Salehfar et al., "A Production Costing Methodology for Evaluation of Direct Load Control," IEEE Transactions on Power Systems, vol. 6, No. 1, Feb. 1991, pp. 278-284.
Samadi et al., "Advanced Demand Side Management for the Future Smart Grid Using Mechanism Design," IEEE Transactions on Smart Grid, vol. 3, No. 3, Sep. 2012, pp. 1170-1180.
Sastry et al., "Use of residential smart appliances for peak-load shifting and spinning reserves: Cost/benefit analysis," Pacific Northwest National Laboratory, Tech. Rep. PNNL-20110, 86 pages (2010).
Satayapiwat et al., "A Utility-based Double Auction Mechanism for Efficient Grid Resource Allocation," Int'l Symp. on Parallel and Distributed Processing with Applications (ISPA '08), pp. 252-260 (Dec. 10-12, 2008).
Schneider et al., "A Taxonomy of North American Radial Distribution Feeders," IEEE Power & Energy Society General Meeting, 6 pages (Jul. 2009).
Schneider et al., "Analysis of Distribution Level Residential Demand Response," IEEE/PES Power System Conference and Exposition, 6 pages (Mar. 2011).
Schneider et al., "Detailed End Use Load Modeling for Distribution System Analysis," IEEE Power and Energy Society General Meeting, 7 pages (Jul. 2010).
Schneider et al., "Distribution Power Flow for Smart Grid Technologies," IEEE/PES Power System Conference and Exhibition, 7 pages (Mar. 2009).
Schneider et al., "Evaluation of Conservation Voltage Reduction (CVR) on a National Level," Pacific Northwest National Laboratory PNNL-19596, 114 pages (Jul. 2010).
Schneider et al., "Modem Grid Strategy: Enhanced GridLAB-D Capabilities Final Report," Pacific Northwest National Laboratory PNNL-18864, 30 pages (Sep. 2009).
Schneider et al., "Multi-State Load Models for Distribution System Analysis," IEEE Trans, on Power Systems, vol. 26, No. 4, pp. 2425-2433 (Nov. 2011).
Schneider et al., "Voltage Control Devices on the IEEE 8500 Node Test Feeder," IEEE PES Transmission & Distribution Conference & Exposition, 6 pages (Apr. 2010).
Sharma et al., "Local public good provisioning in networks: A Nash implementation mechanism," IEEE Journal on Selected Areas in Communications, vol. 30, No. 11, Dec. 2012, pp. 2105-2116.
Shu et al., "Dynamic Incentive Strategy for Voluntary Demand Response Based on TDP Scheme," Proc. IEEE Asia-Pacific Signal & Information Processing Association Annual Summit Conf., 6 pages (Dec. 2012).
Siemens, "Power Transmission System Planning Software," downloaded from the World Wide Web, 8 pages (downloaded on Oct. 27, 2016).
Siljak et al., "Robust Decentralized Turbine/Governor Control Using Linear Matrix Inequalities," IEEE Trans. On Power Systems, vol. 17, No. 3, pp. 715-722 (Aug. 2002).
Siljak et al., "Robust Stabilization of Nonlinear Systems: The Lmi Approach," Mathematical Problems in Engineering, vol. 6, No. 5, pp. 461-493 (Jun. 2000).
Singh et al., "Effects of Distributed Energy Resources on Conservation Voltage Reduction (CVR)," IEEE Power and Energy Society General Meeting, 7 pages (Jul. 2011).

(56) References Cited

OTHER PUBLICATIONS

Sonderegger, "Diagnostic Tests Determining the Thermal Response of a House," Lawrence Berkeley Laboratory, Nov. 1977, 18 pages.
Sonderegger, "Dynamic models of house heating based on equivalent thermal parameters," Ph.D. Thesis, Princeton University, Dec. 1978, 277 pages.
Steinway, Book Review of "Estimation Theory with Applications to Communication and Control," IEEE Transactions on Systems, Man, and Cybernetics, Oct. 1971, p. 405.
Subbarao et al., "Transactive Control and Coordination of Distributed Assets for Ancillary Services," PNNL-22942, 56 pages (Sep. 2013).
Tang et al., "Summary of Electric Distribution System Analyses with a Focus on DERs," Pacific Northwest National Laboratory, Tech. Rep. PNNL-26272, 50 pages (2017).
Tao et al., "A distributed algorithm for economic dispatch over time-varying directed networks with delays," IEEE Transactions on Industrial Electronics, vol. 64, No. 6, 11 pages (Jun. 2017).
Taylor et al., "GridLAB-D Technical Support Document: Residential End-Use Module Version 1.0," Pacific Northwest National Laboratory PNNL-17694, 30 pages (Jul. 2008).
Trudnowski et al., "Overview of Algorithms for Estimating Swing Modes from Measured Responses," Power Energy Society General Meeting, 8 pages (Jul. 2009).
Vandael et al., "A Scalable Three-Step Approach for Demand Side Management of Plug-in Hybrid Vehicles," IEEE Transactions on Smart Grid, vol. 4, No. 2, Jun. 2013, pp. 720-728.
Varaiya et al., "Direct Methods for Transient Stability Analysis of Power Systems: Recent Results," Proc. IEEE, vol. 73, No. 12, pp. 1703-1715 (1985).
Vrettos et al., "Demand Response with Moving Horizon Estimation of Individual Thermostatic Load States from Aggregate Power Measurements," In 2014 American Control Conference (ACC), Jun. 4-6, 2014, pp. 4846-4853.
Weather History for KOSU, Aug. 2009, 5 pages.
Weather Underground: Weather History for Ohio State University, OH, downloaded from http://www.wunderground.com, 4 pages.
Weckx et al., "Multiagent Charging of Electric Vehicles Respecting Distribution Transformer Loading and Voltage Limits," IEEE Transactions on Smart Grid, vol. 5, No. 6, pp. 2857-2867, 2014.
Wellman, "A Market-Oriented Programming Environment and its Application to Distributed Multicommodity Flow Problems," Journal of Artificial Intelligence Research, Aug. 1993, 23 pages.
Widergren et al., "AEP Ohio gridSMART® Demonstration Project: Real-Time Pricing Demonstration Analysis," PNNL-23192, 92 pages (Feb. 2014).
Widergren et al., "Residential Real-time Price Response Simulation," IEEE Power and Energy Society General Meeting, pp. 3074-3078 (Jul. 2011).
Wikipedia, "Spec:Market-Market Module Overview," downloaded from the World Wide Web, 19 pages (last modified Jan. 2013).
Wilson et al., "Equivalent Thermal Parameters for an Occupied Gas-Heated House," ASHRAE Trans.; (United States), 91(CONF-850606-), 1985, pp. 1875-1885.
Wolak, "Residential Customer Response to Real-Time Pricing: The Anaheim Critical-Peak Pricing Experiment," document marked May 24, 2006, 49 pages (also published as Wolak, "Residential Customer Response to Real-Time Pricing: The Anaheim Critical-Peak Pricing Experiment," Center for the Study of Energy Markets (2007)).
Written Opinion dated Mar. 4, 2011, from International Patent Application No. PCT/US2010/020803, 9 pages.
Written Opinion dated Nov. 28, 2012, from International Patent Application No. PCT/US2012/034559, 5 pages.
Wu et al., "Hierarchical control framework for integrated coordination between distributed energy resources and demand response," Electric Power Systems Research, vol. 150, pp. 45-54 (Sep. 2017).

Xing et al., "Distributed bisection method for economic power dispatch in smart grid," IEEE Trans. Power Syst., vol. 30, No. 6, pp. 3024-3035, Nov. 2015.
Xu et al., "Robust real-time distributed optimal control based energy management in a smart grid," IEEE Trans. Smart Grid, vol. PP, No. 99, pp. 1-12, in print, 2016.
Yang, "Adaptively Robust Kalman Filters with Applications in Navigation," Chapter 2 of Sciences of Geodesy-1, Jun. 2010, pp. 49-82.
Yang et al., "Consensus Based Approach for Economic Dispatch Problem in a Smart Grid," IEEE Transactions on Power Systems,vol. 28, No. 4, Nov. 2013, pp. 4416-4426.
Yang et al., "Minimum-time consensus based approach for power system applications," IEEE Trans. Ind. Electron., vol. 63, No. 2, pp. 1318-1328, Feb. 2016.
Ygge et al., "Decentralized Markets versus Central Control: A Comparative Study," Journal of Artificial Intelligence Research, vol. 11, Oct. 1999, pp. 301-333.
Ygge et al., "Making a Case for Multi-Agent Systems," Research Report 4/97, University of Karlskrona/Ronneby, Sweden 23 pages (also published as Ygge et al., "Making a Case for Multi-Agent Systems," In Multi-Agent Rationality, pp. 156-176, Springer Berlin Heidelberg (1997)).
Ygge, "Market-Oriented Programming and its Application to Power Load Management," Lund University, Ph.D. Thesis, 1998.
Ygge et al., "Power Load Management as a Computational Market," document not dated, 14 pages (published as Ygge et al., "Power Load Management as a Computational Marked," Proceedings of the 2nd International Conference on Multi-Agent Systems (ICMAS '96), pp. 393-400, (1996).
Yin et al., "A Novel Double Auction Mechanism for Electronic Commerce: Theory and Implementation," IEEE Proc. of the Third Int'l Conf, on Machine Learning and Cybernetics, pp. 53-58 (Aug. 2004).
Zhang et al., "Aggregated Modeling and Control of Air Conditioning Loads for Demand Response," IEEE Transactions on Power Systems, vol. 28, No. 4, Nov. 2013, pp. 4655-4664.
Zhang et al., "Convergence Analysis of the Incremental Cost Consensus Algorithm Under Different Communication Network Topologies in a Smart Grid," IEEE Transactions on Power System, vol. 27, No. 4, Nov. 12, pp. 1761-1768.
Zhang et al., "Decentralizing the Economic Dispatch Problem using a Two-Level Incremental Cost Consensus Algorithm in a Smart Grid Environment," In 2011 North American Power Symposium (NAPS), IEEE, Aug. 4-6, 2011, 7 pages.
Zhao et al., "Frequency-based Load Control in Power Systems," American Control Conf., pp. 4423-4430 (2012).
Zhao et al., "Swing Dynamics as Primal-dual Algorithm for Optimal Load Control," IEEE Int'l Conf. on Smart Grid Comm., pp. 570-575 (2012).
Zhao et al., "Stability Analysis of Multi-Period Electricity Market with Heterogeneous Dynamic Assets," arXiv: 1703.10267 [math. OC] (Mar. 2017).
Zhou et al., "Pseudo-gradient based local voltage control in distribution networks," arXiv preprint arXiv: 1508.02796, 2015.
Zhu et al., "Fast local voltage control under limited reactive power: Optimality and stability analysis," IEEE Trans. Power Syst.,vol. 31, No. 5, pp. 3794-3803, Sep. 2016.
Zimmerman et al., "A 'SuperOPF' Framework," FERC Technical Conf. on Enhanced Optimal Power Flow Models, PowerPoint presentation, 39 pages (Jun. 2010).
Zimmerman et al., "MATPOWER: Steady-State Operations, Planning, and Analysis Tools for Power Systems Research and Education," IEEE Transactions on Power Systems, vol. 26, No. 1, Feb. 2011.
Zheng et al., "Stochastic Optimization for Unit Commitment: A Review," IEEE Trans. On Power Systems, vol. 30, No. 4, pp. 1913-1924 (Jul. 2015).

\* cited by examiner

HIERARCHAL FRAMEWORK FOR INTEGRATING DISTRIBUTED ENERGY RESOURCES INTO DISTRIBUTION SYSTEMS

CROSS-REFERENCE TO RELATED APPLICATIONS

This application claims the benefit of U.S. Provisional Application No. 62/532,561, entitled "Systems and Methods for Integrating Distributed Energy Resources into Distribution Systems," filed Jul. 14, 2017. The disclosure of U.S. Provisional Application No. 62/532,561 is hereby incorporated by reference in its entirety.

ACKNOWLEDGMENT OF GOVERNMENT SUPPORT

The present disclosure was made with government support under Contract DE-AC0576RL01830 awarded by the U.S. Department of Energy. The Government has certain rights in this invention.

BACKGROUND

The number of sensors and controllers connected to the electric power system is expected to grow by several orders of magnitude over the next several years. However, the information networks that are currently used to transmit and analyze data on the system are ill-equipped to handle the volume of communications resulting from the increased number of sensors. For example, the current information networks are incapable of delivering large amounts of data collected by the sensors in a predictable, time-effective, and reliable manner.

Without the ability to effectively manage and use data from the sensors, the deployment of sensors into the power grid (e.g., phasor measurement sensors into the transmission system and smart meters into the distribution system) will not maximize the potential improvements to the power grid that are possible with the use of such sensors. For example, existing bidding strategies for wholesale market may require multiple bidding iterations, large amounts of bid data, and an inability to encode private information into consumer bids, which can hamper deployment of successful strategies for control schemes for demand response. Accordingly, there is ample opportunity for improved systems, methods, and apparatus for managing and using data in a power grid or other electric power distribution system.

SUMMARY

Apparatus and methods are disclosed for the design, analysis, testing, and manufacture of devices used to coordinate and control groups of distributed energy resources (DERs) such as controllable loads, distributed generators, and inverter-interfaced energy resources. DERs are generally decentralized, modular devices. DERs can be devices that generate electric power or loads that consume electric power. DERs can be used to increase the performance of the power system through improved grid reliability and resiliency. Accordingly, in certain examples of the disclosed technology, it is desirable to develop methods and apparatus to coordinate and control DERs in order to seamlessly integrate the DERs into a power system.

Integrating DERs into the power grid can have a number of advantages. For example, in certain examples, DERs can be more flexible and environmentally friendly than conventional power stations. However, DERs can also be less consistently reliable, particularly with respect to renewable energy resources. As such, integrating DERs into a power system to maximize their potential to improve grid reliability and resiliency requires considerable coordination and control of the resources.

Traditionally, DERs are controlled from the supply side using a strategy of direct control. With direct control, utility companies can remotely control residential loads based on customer agreements. However, when a power system includes a large number of DERs, it can be beneficial to shift control to the distribution side. A typical control strategy involving the distribution side is price control, where price signals are sent to individual loads to affect local demand.

An alternative control strategy is transactive or market-based control. Market-based control is a special type of price control in which automated loads can engage in market interaction using price controls while also taking into account desired outputs. Each resource can be treated as a market participant with certain market rules that are used for control such that eventually a system equilibrium can be achieved. Market-based control can promote voluntary participation by promoting value-based incentives. Local objectives of various consumers and owners of DERs that may have different preferences can be respected and considered in the control framework. Market-based control can help ensure the stability and predictability of the overall system response, which can facilitate the coordination of the DERs with the bulk power system markets. Market-based controls can also enable an easy integration of DERs into the bulk power system markets.

A coordinator can be used to coordinate and control DERs using a market-based control strategy. However, if a large number of DERs are present in a power system, it can be difficult for a single coordinator to manage the computation and communication required to coordinate and control all of the DERs in the power system. Accordingly, a framework is disclosed herein that decomposes a power distribution system into multiple levels. A first level of the disclosed framework can comprise all of the DERs in a power system. A second level can comprise a plurality of aggregators, wherein each aggregator is responsible for a certain number of DERs. Each aggregator can communicate with each of the DERs that it is responsible for and aggregate all information received from these DERs. A third level can comprise a coordinator or distribution system operator (DSO), which can communicate with and coordinate the aggregators of the second level. Thus, under this type of framework, each element has much smaller communication and computation requirements than would be necessary if a single coordinator were controlling every DER in the system. This framework can be used to seamlessly integrate DERs into a power distribution system. In one embodiment, the disclosed framework applies marked-based approaches to optimize the energy management of the various DERs. In other embodiments, the disclosed framework can be used to solve other problems involving the integration of DERs into a power distribution system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following Detailed Description, which proceeds with reference to the accompanying figures.

DETAILED DESCRIPTION

I. General Considerations

Figure 1:
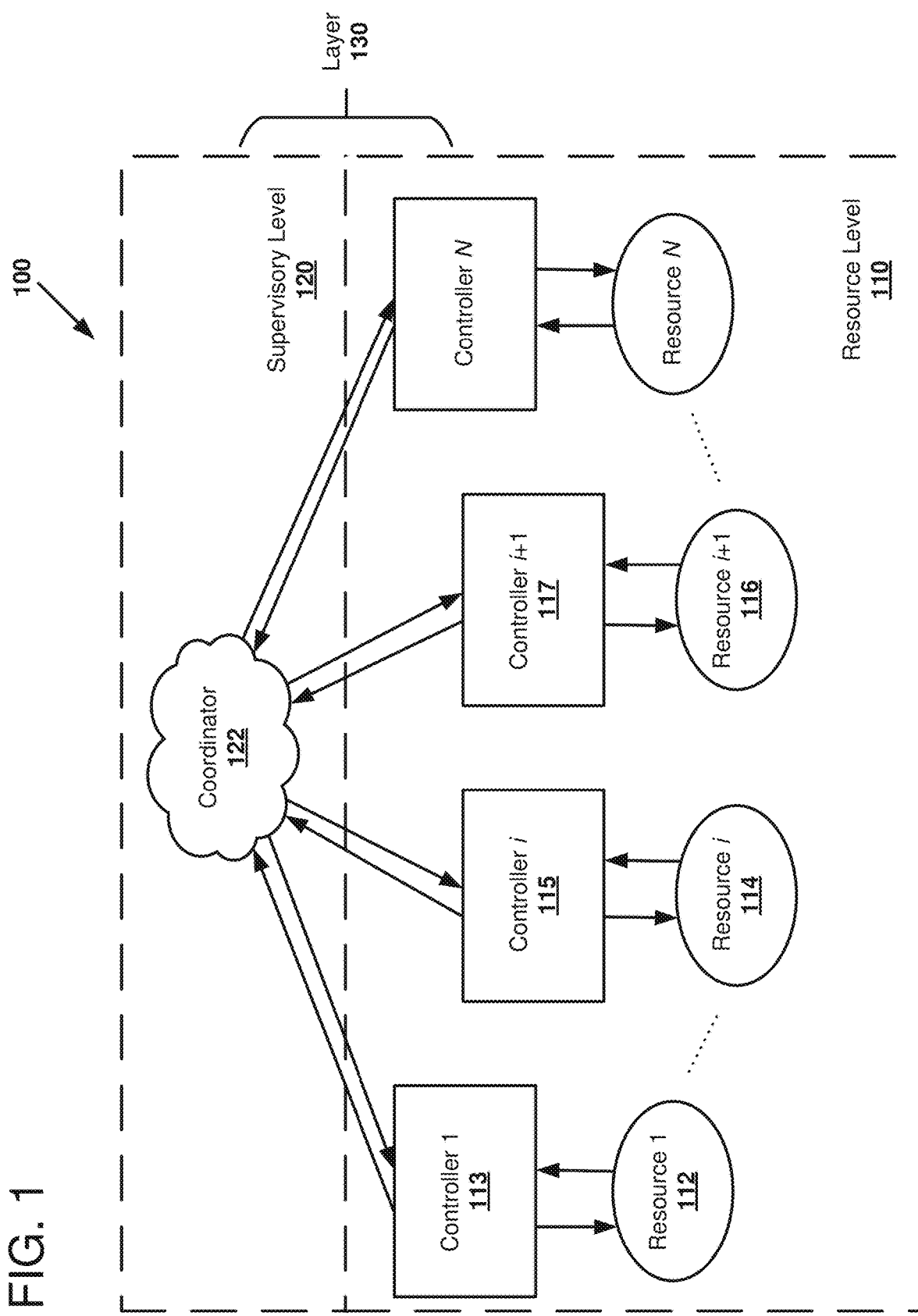
FIGS. 1-4 are diagrams illustrating example single-layer systems for coordinating and controlling a plurality of DERs.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "determine," "send," "transmit," and "perform" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to an electrical device (or element) that is configured to interact with controllers and coordinators. For example, the integrated circuit can be embedded in or otherwise coupled to an energy resources, for example: a generator (e.g., a wind-based generator, solar-based generator, coal-based generator, or nuclear generator), an air-conditioning unit; heating unit; heating, ventilation, and air conditioning ("HVAC") system; hot water heater; refrigerator; dish washer; washing machine; dryer; oven; microwave oven; pump; home lighting system; electrical charger, electric vehicle charger; or home electrical system.

II. Introduction to the Disclosed Technology

Methods and apparatus are disclosed for implementing and/or integrating distributed energy resources into distribution systems. DERs are desirably decentralized, modular, and more flexible than traditional power plants. DERs can often comprise renewable energy resources. DERs are increasingly becoming an important part of electrical power grids. However, because they are decentralized, they require coordination and control to seamlessly integrate them into a power system.

FIG. 1 shows an example control architecture 100 for coordinating and controlling a plurality of DERs that can be applied to a power distribution system. In the example of FIG. 1, the system 100 includes a single layer 130 comprising a resource level 110 and a supervisory level 120. The resource level 110 comprises a plurality of DERs 112, 114, 116, up to Resource N. Each DER can be controlled by a respective controller 113, 115, 117, etc. In the example of FIG. 1, each controller can send information to and receive information from a coordinator 122 at the supervisory level 120. Thus, in the example system 100 of FIG. 1, the coordinator 122 can coordinate each of the N DERs.

The example system 100 of FIG. 1 can implement market-based control frameworks to coordinate the DERs. In such a market-based framework, each DER can send bids and other information to the coordinator 122, and the coordinator can determine a market price based on the information received from each of the DERs and any power constraints. The coordinator can then send the determined market price to each of the DERs, which can take certain actions based on the market price and the market can be cleared. The system 100 of FIG. 1 can implement a market-based framework to maximize social welfare subject to a feeder power constraint.

In the example system 100 of FIG. 1, the goal of the market-based framework is to use market principles to realize an efficient coordination among different systems resources to achieve a global objective. In the illustrated example, the global objective is to optimize power flow over the entire system, where each resource is a market participant with certain goals. In other examples, there can be a different global objective. In the illustrated example, a supplier that provides electricity tries to maximize the surplus to generate electricity, $$\min_p C(p, \theta) - \lambda p$$

$$\text{subject to } p \in \mathcal{L}$$

where C is cost, p is load power, θ is local private information, and $\mathcal{L}$ represents local constraints. Meanwhile, a consumer attempts to maximize the surplus to consume electricity, $$\max_p U(p, \theta) - \lambda p$$

$$\text{subject to } p \in \mathcal{L}$$

where U is utility. The local constraints $\mathcal{L}$ are generally expressed as a capacity limit or a ramping limit determined by system dynamics, $$\mathcal{L} = \left\{ p \left| \begin{array}{l} x_{k+1} = f(x_k, u_k) \\ p_k = g(x_k, u_k) \\ x_k \in \mathcal{X}_k \\ p_k \in \mathcal{P}_k \end{array} \right. \right\}$$

At the supervisory level 120, in the illustrated example the coordinator 122 has a global objective of maximizing social welfare, $$\max_{p_i^l, p_j^g} \sum_{i=1}^{N_l} U_i(p_i^l, \theta_i^l) - \sum_{j=1}^{N_g} C_j(p_j^g, \theta_j^g)$$

subject to $E(p_i^l, p_j^g) \leq 0$(global constraints)

$p_i^l \in \mathcal{L}_i^l$(local constraints)

$p_j^g \in \mathcal{L}_j^g$(local constraints)

where global constraints depend on factors such as power balance, line flow, voltage magnitude, system reserve, and energy goal. The coordinator 122 must also respect local constraints.

Figure 2:
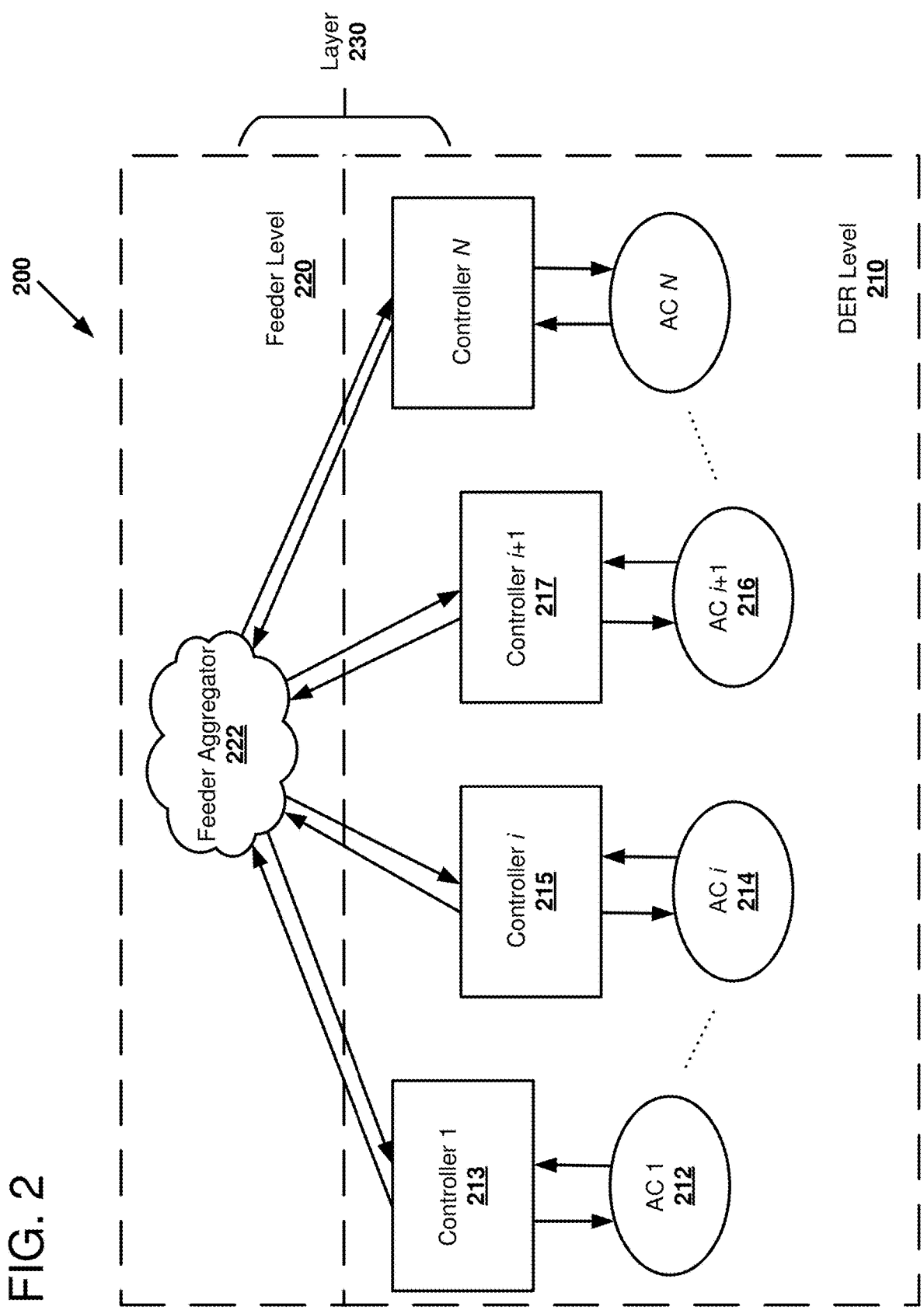
Figure 3:
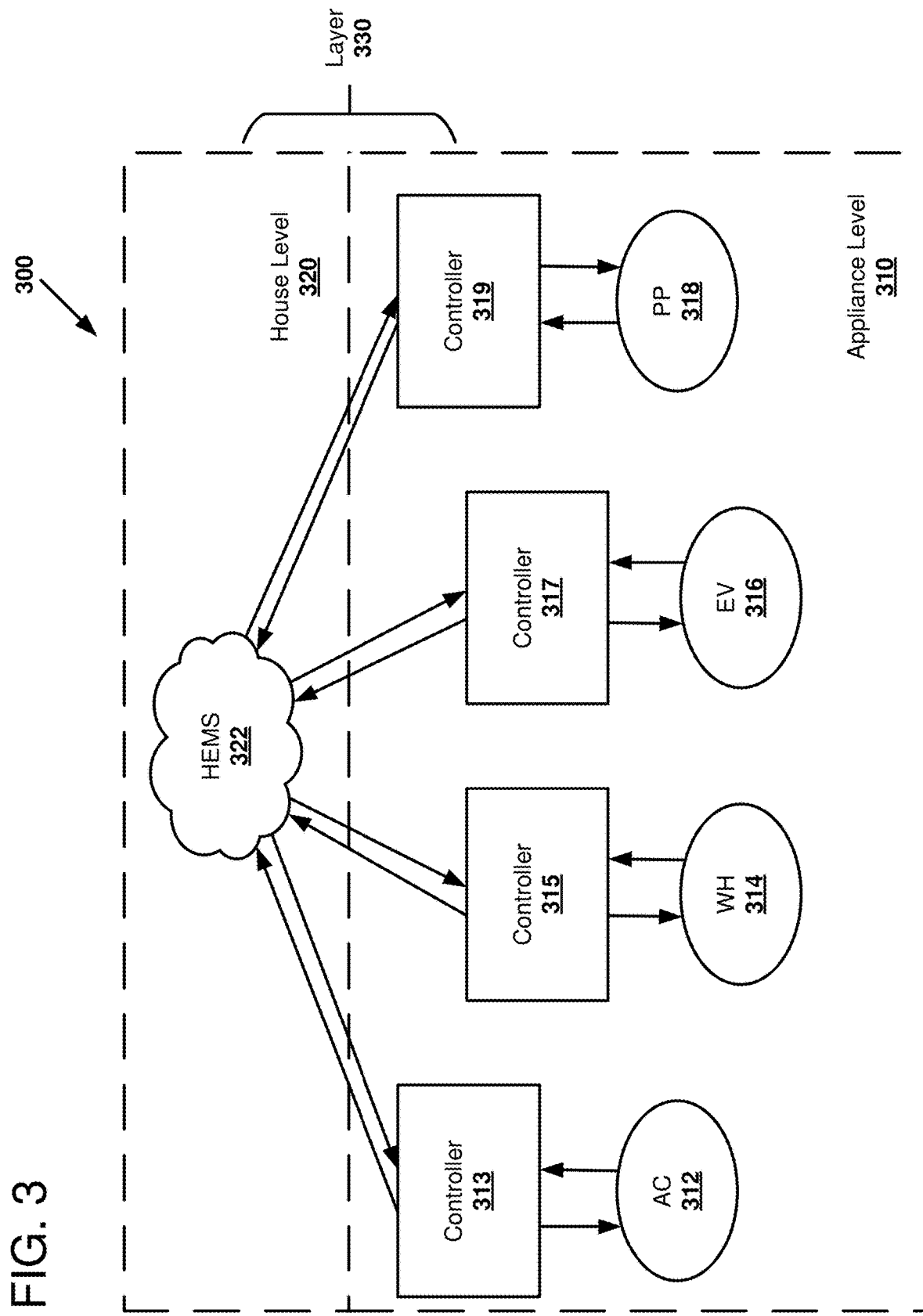
Figure 4:
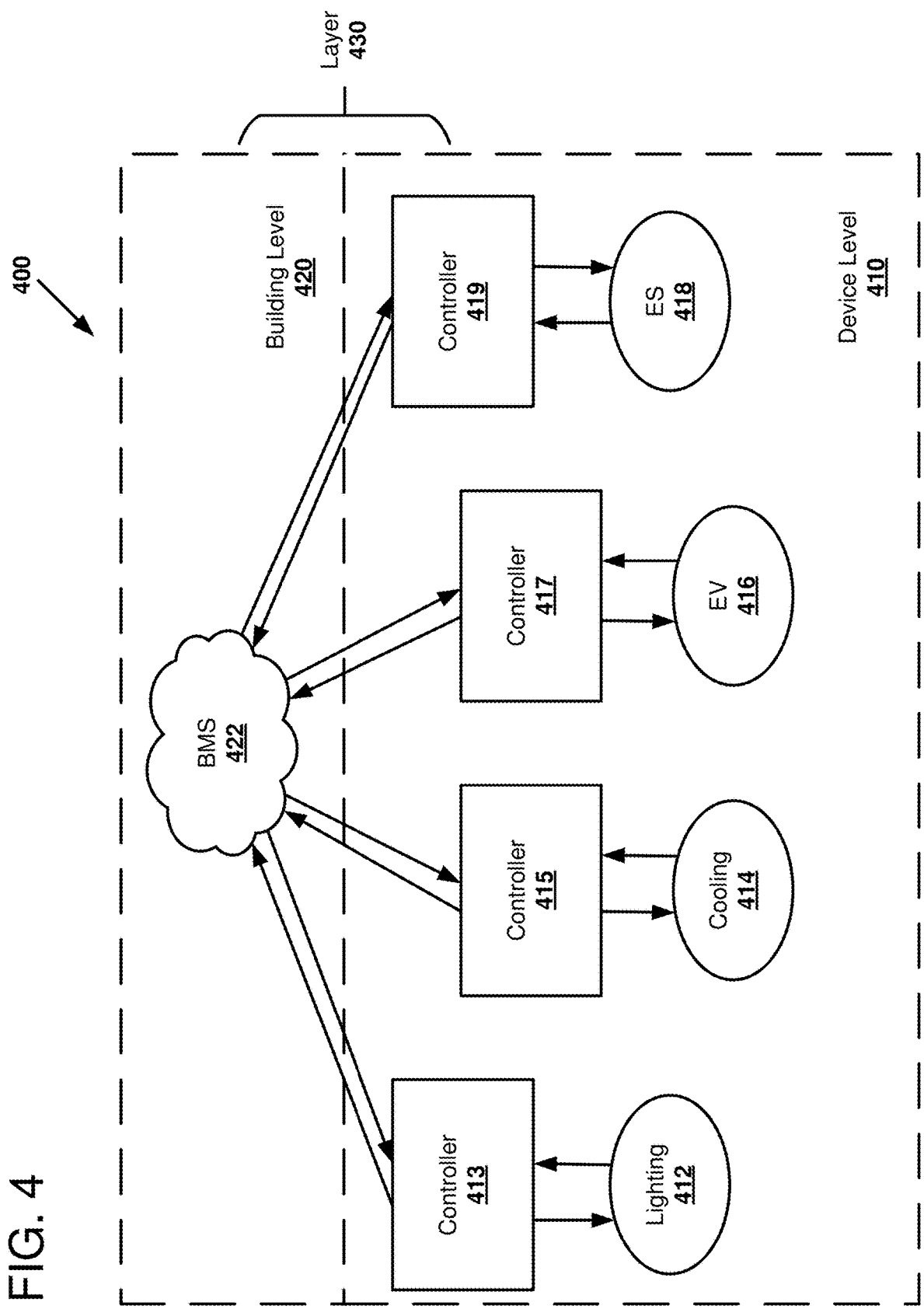

FIGS. 2-4 show example systems where the single-layer marked based framework discussed above is used.

FIG. 2 shows an example transactive DER system 200 for coordinating and controlling a plurality of responsive loads (e.g., air conditioning units) under a feeder. In the example of FIG. 2, the system 200 comprises a single layer 230 including a DER level 210 and a feeder level 220. The DER level 210 can comprise a plurality of loads AC 212, AC 214, AC 216, up to AC N. Each load can be controlled by a respective controller 213, 215, 217, etc. The feeder level 220 can comprise a feeder aggregator 222 that can coordinate and control the loads of the DER level 210 using the market-based framework discussed above in connection with FIG. 1.

FIG. 3 shows a transactive home system 300 for coordinating and controlling a plurality of loads in a home. In the example of FIG. 3, the system 300 comprises a single layer 330 including an appliance level 310 and a house level 320. The appliance level 310 can comprise a number of appliances 312, 314, 316, 318 and corresponding controllers 313, 315, 317, 319. The house level 320 can comprise a home energy management system (HEMS) 322 that can coordinate and control the appliances of the appliance level 310 using the market-based framework discussed above in connection with FIG. 1.

FIG. 4 shows a transactive building system 400 for coordinating a plurality of loads in a building. In the example of FIG. 4, the system 400 comprises a single layer 430 including a device level 410 and a building level 420. The device level 410 can comprise a number of devices 412, 414, 416, 418 and corresponding controllers 413, 415, 417, 419. The building level 420 can comprise a building management system (BMS) 422 that can coordinate and control the devices of the device level 410 using the market-based framework discussed above in connection with FIG. 1.

The systems 100, 200, 300, 400 of FIGS. 1-4 are single-layer market-based framework works well for relatively small systems. However, for systems in which there are a large number of DERs, the communication infrastructure necessary to communicate with each of the DERs and the computation infrastructure necessary to process the information received from each DER can be burdensome. As such, it can be advantageous to decompose the system in a hierarchical manner. For example, a system can be decomposed into two layers comprising three levels including an intermediate level comprising a plurality of aggregators. In such a framework, each aggregator can communicate with a relatively small number of DERs and a coordinator can communicate with each of the relatively small number of aggregators. Then the optimal power flow problem can be decomposed into many sub-problems, which are more easily solved. This can reduce the communication and computational capabilities required by any one entity to a manageable level.

Figure 5:
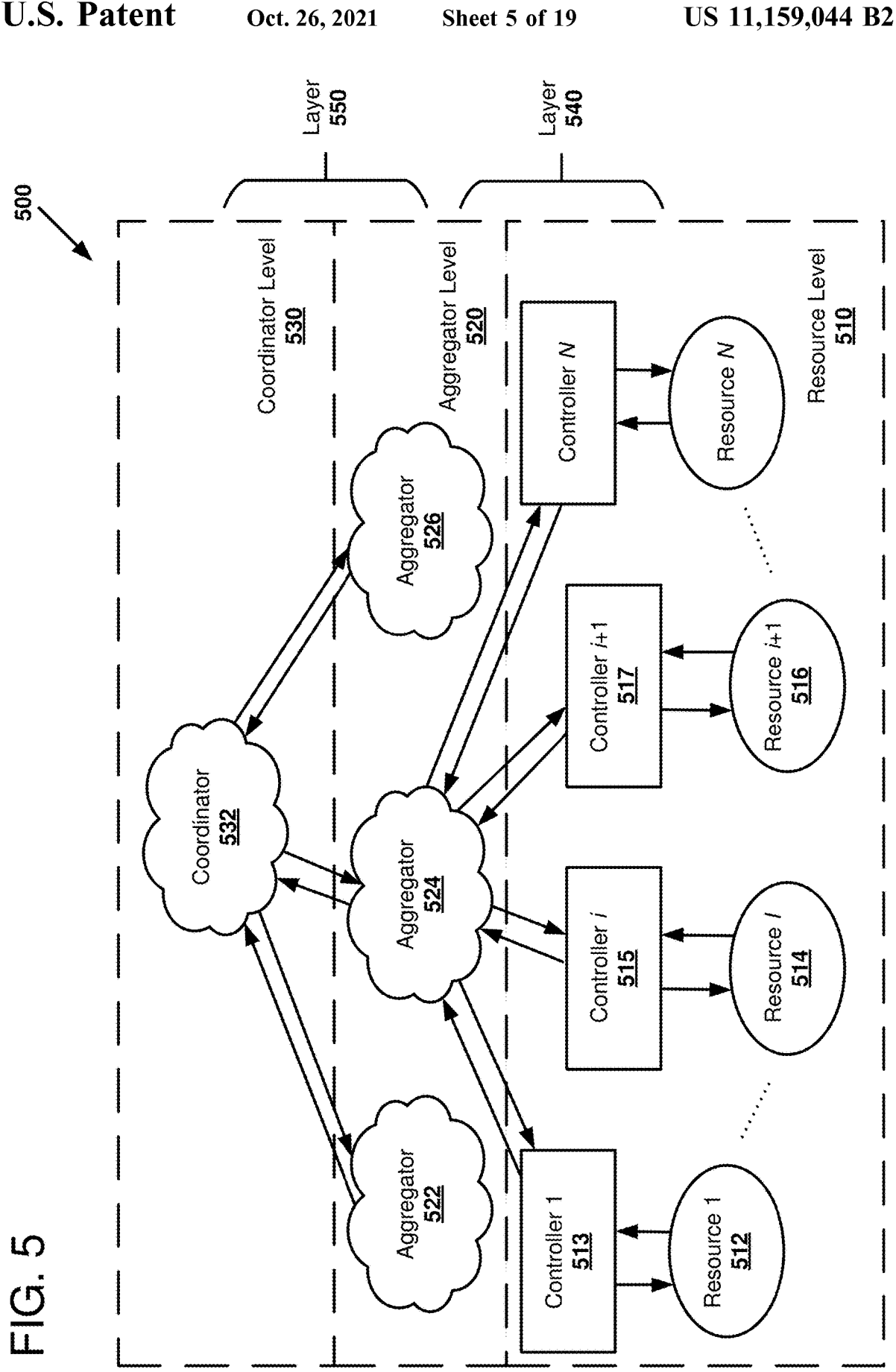
FIG. 5 is a diagram illustrating an example two-layer system for coordinating and controlling a plurality of DERs.

FIG. 5 shows a multi-layer power system 500 for coordinating and controlling a plurality of DERs. In the examples disclosed herein, each layer of a system comprises two levels. Thus, in the example of FIG. 5, system 500 comprises two layers comprising three levels. The first layer 540 comprises a resource level 510 and an aggregator level 520 and the second layer 550 comprises the aggregator level and a coordinator level 530.

The resource level 510 comprises a plurality of DERs 512, 514, 516, up to DER N. Each DER is controlled by a respective controller 513, 515, 517, etc. Each of the DERs of the resource level 510 can be either a producer of electricity or a load that consumes electricity.

The aggregator level 520 comprises a plurality of aggregators or aggregation servers. In the illustrated example of FIG. 5, the aggregator level 520 comprises three aggregators 522, 524, 526. In other examples, the aggregator level 520 can comprise any number of aggregators. In the illustrated example of FIG. 5, each aggregator of the aggregator level 520 is responsible for a subset of the DERs of the resource level 510 and can send and receive information from the controllers corresponding to those DERs. In some examples, each aggregator is responsible for the same or a similar number of DERs. In other examples, each aggregator is responsible for a different number of DERs.

The coordinator level 530 is similar to the supervisory level 120 of FIG. 1 and comprises a coordinator 532 or coordination server. However, instead of communicating directly with DERs, as the coordinator 122 of FIG. 1 does, the coordinator 532 of FIG. 5 communicates with the aggregators of the aggregator level 520 as described herein. Using this framework, the problem of optimal power flow calculation for the system 500 can be decomposed into smaller sub-problems that can be solved sequentially or in parallel, which can be more computationally manageable. This framework can also allow for modular development, testing, and deployment. In addition, DERs that are geographically close to each other can be aggregated together to decrease latency and bandwidth requirements for information exchange.

Utilizing the framework of FIG. 5, there can be a standardized information exchange between any two levels. Thus, a level can be easily added to or removed from the system 500. The system 500 can also be easily incorporated into a legacy power system and can follow the same market-based rules from the legacy system.

In the illustrated example, the information exchanged between two levels is a utility function. At the resource level 510, the utility functions can be can be a demand function that relates an amount of energy produced or consumed by a resource based on energy price. The demand function can be determined based on the preferences of the owner or operator of the resource. For example, the resource can be a thermostatically controlled load and the demand function can be based on settings that a user can enter to select between comfort and energy savings. The more this setting is weighted towards comfort, the more the resource will be willing to pay for energy. The more this setting is weighted towards energy savings, the less the resource will be willing to pay for energy.

However, at intermediate levels, such as the aggregator level 520, each aggregator must aggregate the utility functions from DERs under its authority and derive an aggregated utility function to send to the coordinator 532. This aggregated utility function can represent an aggregate demand curve for all the DERs under the authority of a particular aggregator. Once the coordinator 532 receives an aggregated utility function, it can use the received aggregated utility function to determine a clearing value (e.g., a market clearing energy price) and to send this clearing value back to the aggregators. The aggregators can then relay the clearing value to each resource controller and each resource controller can determine whether or not to produce or consume energy based on the clearing value.

Thus, in many examples of the disclosed technology it is desirable to decompose the system 500 in a manner such that an aggregated utility function can be derived that accurately reflects utility functions across individual levels. More specifically, it is desirable to decompose a power system such that the optimal power flow problem can have an equivalent decomposition without losing global optimality. If a power system is decomposed in an improper way, the optimal power flow calculations for the system can become inaccurate. It is therefore important to determine how to decompose a power system such as system 500 of FIG. 5. That is, the locations of the aggregators of the aggregator level 520 are not arbitrarily chose but are located at specific, chosen locations as described herein.

At each signal point in a power system, there is a real power component, a reactive power component, and a voltage component. Mathematically, it can be shown that decomposition points (e.g., locations of aggregators) must be located at points where voltage is decoupled from real and reactive power in order to avoid changing the optimal power flow problem. In order to have a valid decomposition, real and reactive power can be dealt with but voltage must be decoupled. As such, decomposition should occur at locations in a power system where voltage is decoupled. As such, an ideal decoupling point is a point where a voltage regulated transformer exists, since voltage regulated transformers typically decouple voltage. Therefore, each aggregator of the aggregator level 520 is desirably located at a point where a voltage regulated transformer exists. Thus, when computing optimal power flow calculations of the decomposed system, only real and reactive power need to be considered.

Figure 6B:
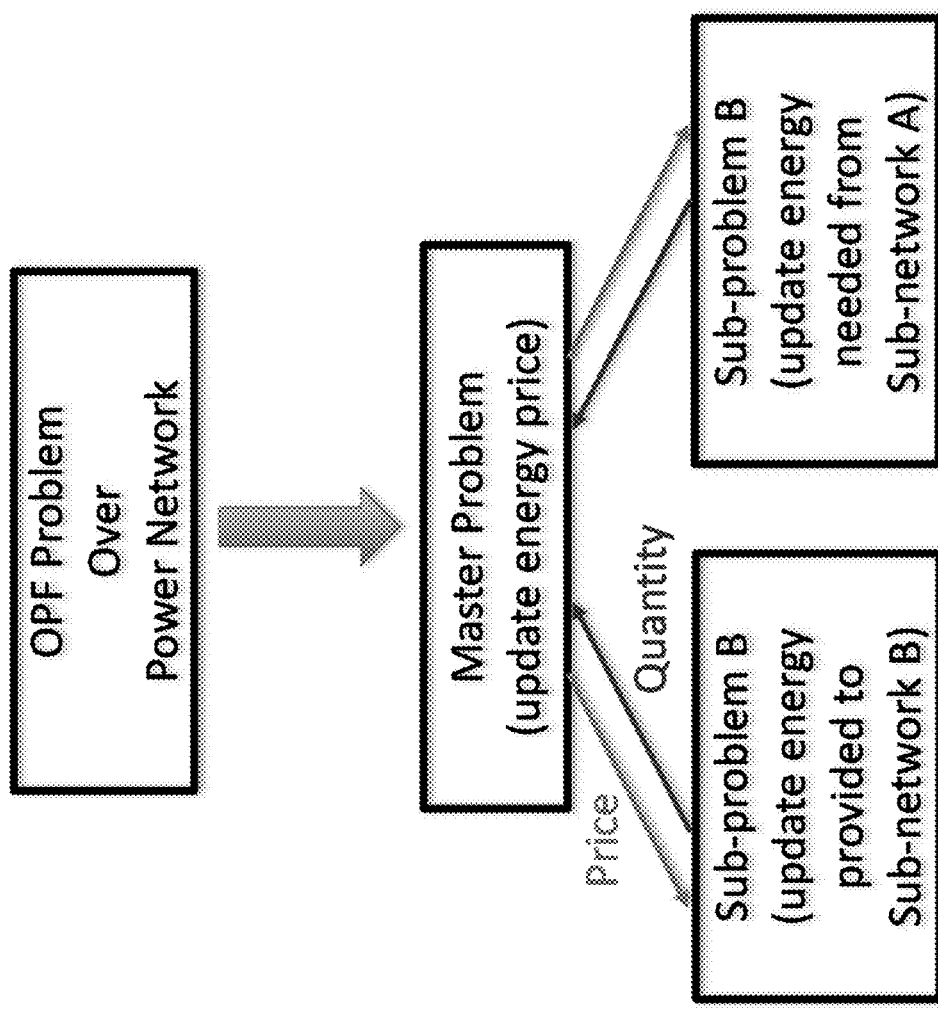
FIGS. 6A, 6B, 7A, 7B, and 7C illustrate example decomposition of multiple sub-networks of a power network.
Figure 6A:
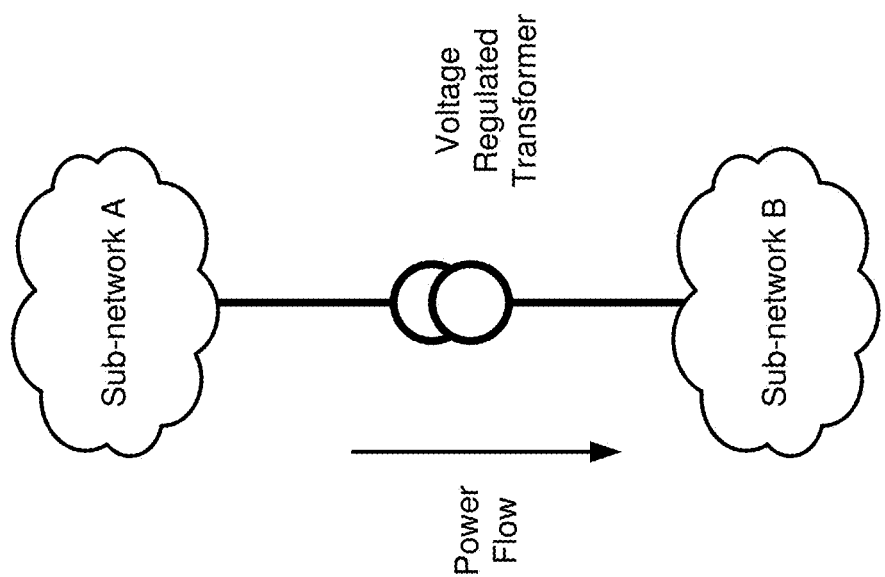

Once decompositions points are chosen at locations where voltage regulated transformers exist, a power network can be decomposed into two sub-networks as shown in FIG. 6A. Then the optimal power flow (OPF) problem can be decomposed into two sub-problems as shown in FIG. 6B. If a power network is too large to be decomposed into two levels, it can be decomposed into three sub-networks, Sub-network A, Sub-network B, and Sub-network C, as shown in FIG. 7A, where each sub-network is divided along a path with voltage-regulated transformers.

Figure 7C:
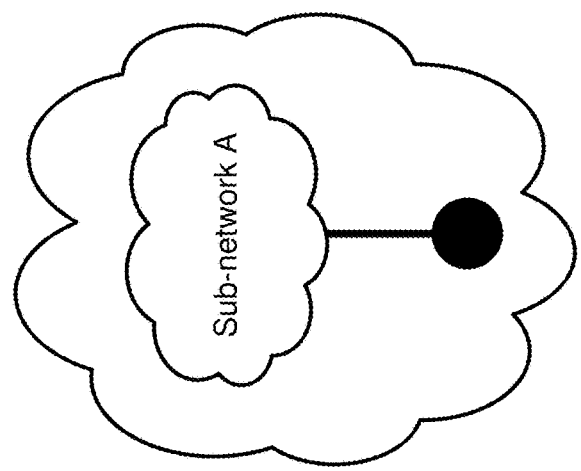
Figure 7B:
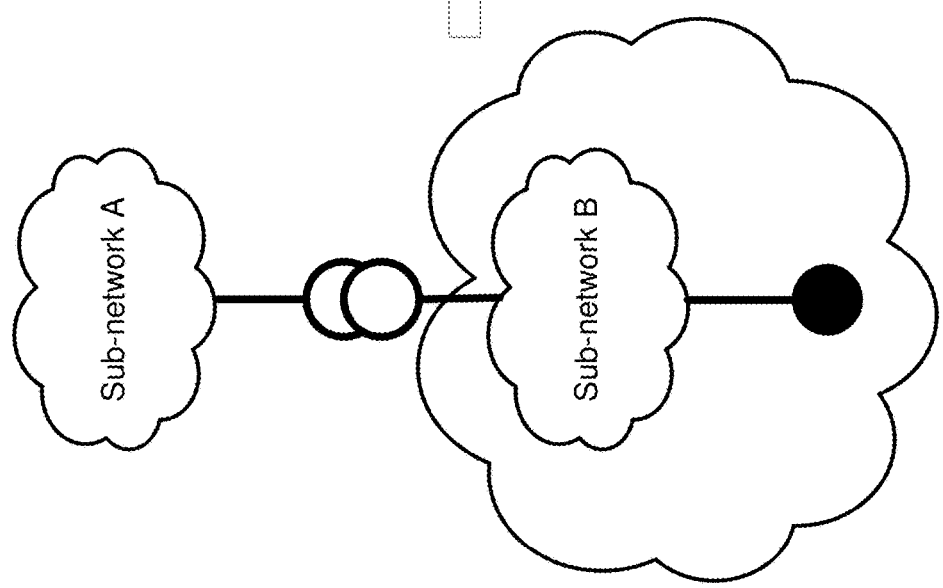

Once a power network is decomposed into a number of sub-networks, the lowest level network can be aggregated such that it is reduced into a single node with respect to the next highest level, as explained in further detail below. For example, as shown in FIG. 7B, Sub-network C can be reduced to a node and incorporated into Sub-network B. Then, the new Sub-Network B can be reduced to a single node and incorporated into Sub-network A as shown in FIG. 7C. Thus, computing optimal power flow over an entire system devolves into a series of smaller optimal power flow computations involving sub-networks.

In order to aggregate a particular sub-network to a node, the node must fully represent the previous subsystem after aggregation. Thus, an appropriate method of aggregating information is needed. As part of a power system, each sub-network will receive a price signal and output a power signal. In order to aggregate a sub-network to a single node, an aggregated utility function can be identified on a price/response curve. This aggregation can consider power flow that includes a voltage regulated transformer as discussed above. If a utility function U(p) for a given sub-network is correctly determined, the function will include all necessary dynamics of the sub-network. Specifically, for any given energy price λ, a sub-network will consume an aggregated amount of energy p. Thus a demand function p=d(λ) can be determined by considering all possible energy prices. Thus, an aggregated utility function can be determined as $U(p) = \int_{p_{min}}^{p_{max}} d^{-1}(\tau) d\tau$.

Figure 7A:
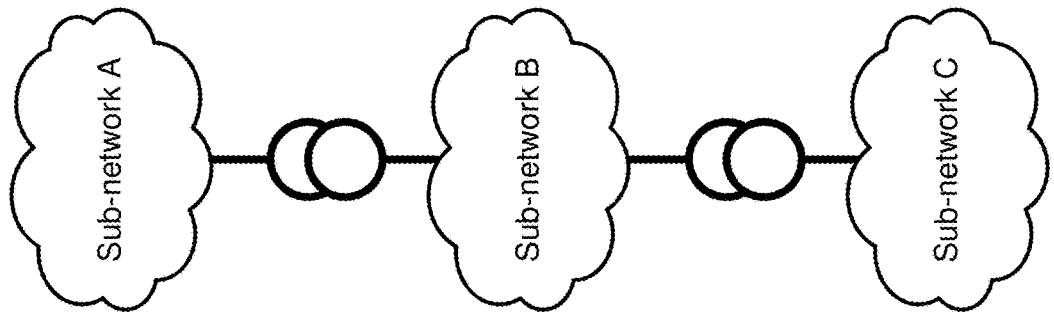

Therefore, in the example of FIG. 7A, Sub-network C can use the above equation to compute an aggregated utility function U(p) and submit this utility function to Sub-network B. Then, as shown in FIG. 7B, Sub-network B can treat Sub-network C as a single node with this aggregated utility function and can compute its own aggregated utility function U(p). This aggregated utility function for Sub-network B can then be submitted to Sub-network A such that the aggregated Sub-networks B and C can be treated as a single node by Sub-network A as shown in FIG. 7C.

Figure 8:
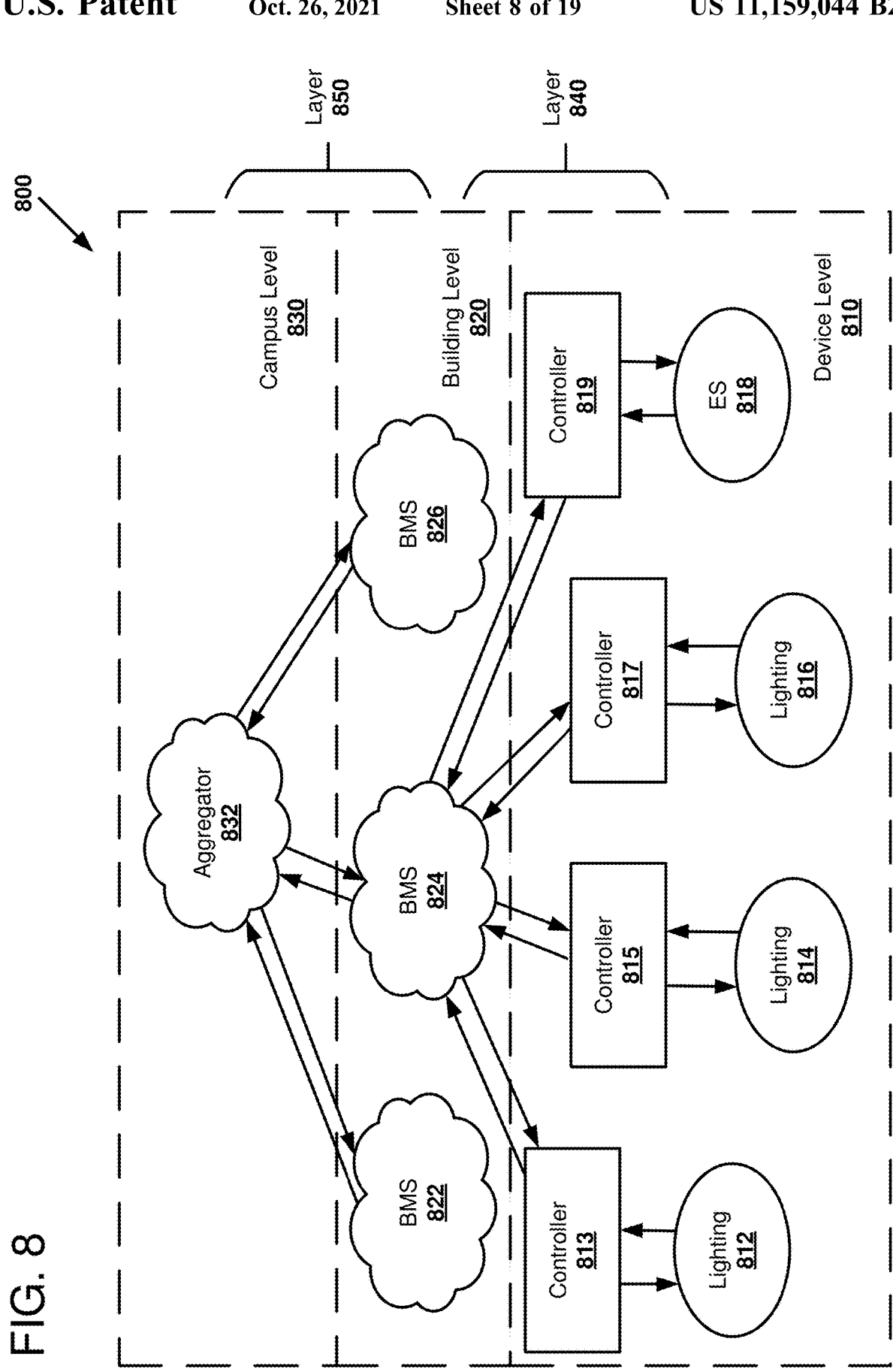
FIG. 8 is a diagram of another example two-layer system for coordinating and controlling a plurality of DERs.

FIG. 8 shows an example system 800 that utilizes the multi-layer framework discussed above. The system 800 comprises a first layer 840 comprising a device level 810 and a building level 820 and a second layer 850 comprising the building level and a campus level 830. The campus level 830 comprises an aggregator 832 that that controls the entire system. The building level 820 comprises a number of building management systems 822, 824, 826. In the illustrated example of FIG. 8, there are three building management systems but in other examples there can be any number of building management systems. In the example of FIG. 8, each BMS corresponds to one building on a campus. The device level 810, comprises a number of devices and corresponding controllers contained within a particular building. In the example of FIG. 8, lighting devices 812, 814, 816, 818 and corresponding controllers 813, 815, 817, 819 are shown as being under the authority of BMS 824. Other devices in other buildings are now shown in FIG. 8. There can be any number of devices contained in each building under the authority of a particular BMS.

The multi-layer framework discussed above can be used to control the power system 800 of FIG. 8. That is, an aggregated utility function can be determined for the plurality of DERs that are under the authority of a particular BMS (e.g, an aggregated utility function can be determined for devices 812, 814, 816, 818). Then, each BMS of the building level 820 can receive an aggregated utility function that can be used to represent the DERs under its authority as a single node. A new aggregated utility function can then be determined representing each BMS of the building level 820 and this aggregated utility function can be submitted to the aggregator 832 in order to determine an optimal power flow for the entire system 800.

Figure 9:
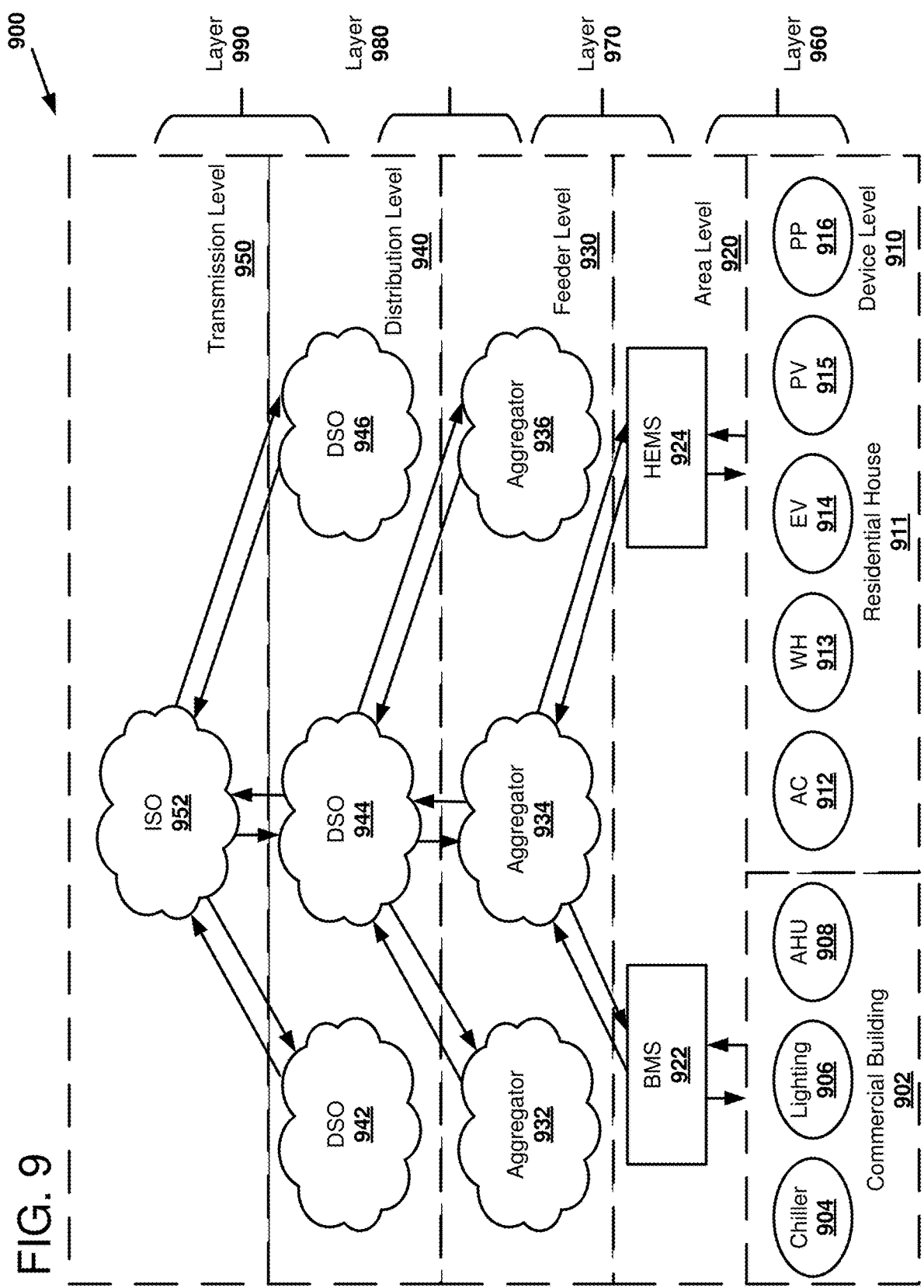
FIG. 9 is a diagram of an example four-layer system for coordinating and controlling a plurality of DERs.

FIG. 9 shows another example system 900 having four layers 960, 970, 980, 990. In the example of FIG. 9, the system 900 includes a large enough number of DERs that it is desirable to decompose the system into four layers comprising five levels. In the example of FIG. 9, layer 960 includes a device level 910 and an area level 920; layer 970 includes the area level and a feeder level 930; layer 980 includes the feeder level and a distribution level 940; and layer 990 includes the distribution level and a transmission level 950. The transmission level 950 can comprise an ISO 952 which can control a number of DSOs of the distribution level 940. The distribution level 940 can comprise a number of DSOs (e.g., DSO 942, 944, 946) that are each responsible for controlling a number of aggregators of the feeder level 930. The feeder level 930 can comprise a number of aggregators (e.g., aggregator 932, 934, 936) that are each responsible for controlling a number of building management systems and/or home energy management systems of the area level 920. The area level 920 can comprise a number of building and/or home energy management systems (e.g., BMS 922, HEMS 924) that are each responsible for controlling a number of DERs of the device level. For example, as shown in FIG. 9, the BMS 922 can be responsible for chiller device 904, lighting device 906 and AHU device 908 of a commercial building 902 and the HEMS 924 can be responsible for AC 912, WH 913, EV 914, PV 915, and PP 916 of a residential house 911.

Each of the plurality of DERs that a particular BMS is responsible for can be represented by an aggregated utility function as discussed above (e.g., an aggregated utility function can be determined that represents devices 812, 814, 816, 818). Thus, a number of aggregated utility functions can be determined equal to the number of management systems in the area level, where each aggregated utility function represents the DERs under the authority of one management system of the area level. These aggregated utility functions can then be used to determine a new aggregated utility function for each management system under the authority of a particular aggregator of the feeder level 930. Thus, a number of aggregated utility functions can be determined equal to the number of aggregators in the area level, where each such aggregated utility function represents the management systems under the authority of one aggregator. These aggregated utility functions can then be used to determine a new aggregated utility function for each aggregator under the authority of a particular DSO in the distribution level. Thus, a number of aggregated utility functions can be determined equal to the number of DSOs in the distribution level, where each such aggregated utility function represents the aggregators under the authority of one DSO. Finally, an aggregated utility system can be determined for each of the DSOs in the distribution level 940 and this aggregated utility function can be passed to the ISO 952.

Figure 10:
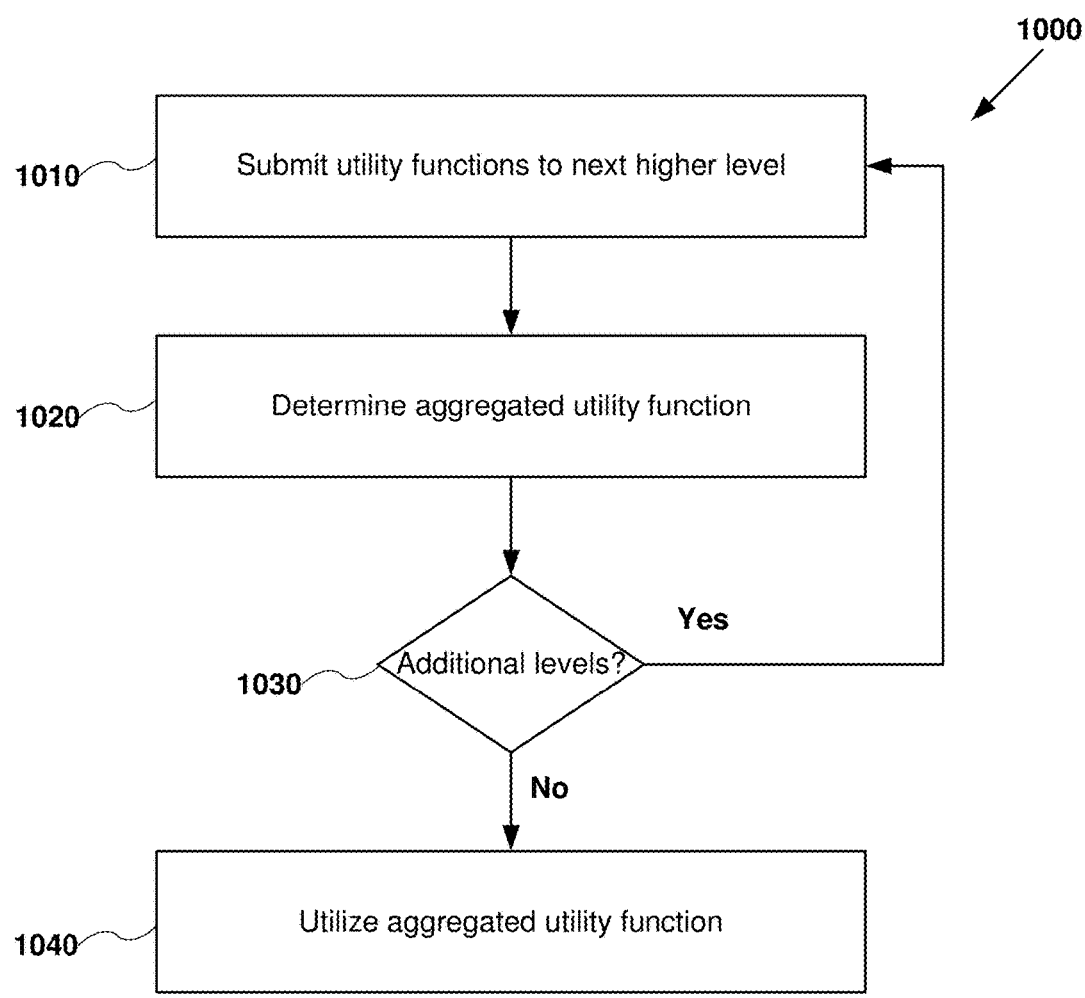
FIG. 10 illustrates an example method of determining an aggregated utility function, as can be performed in certain examples of the disclosed technology.

FIG. 10 is a flowchart 1000 outlining an example method of determining an aggregated utility function for a power system such as system 500 of FIG. 5. For example, the computing environment of FIG. 19 can be used to perform the illustrated method.

At process block 1010, each DER of a power system transmits its utility function to an aggregator or other device one level higher that is responsible for aggregating the utility functions of the DERs. At process block 1020, the aggregator or other device receiving the utility functions determines an aggregated utility function based on the received utility functions as described above. At process block 1030, the system determines whether there are additional levels above the level receiving the aggregated utility functions. If there are additional levels, then control returns to block 1010 and each device (e.g., each aggregator) transmits its utility function to a device at a higher level. This process continues until the highest level of the system has computed an aggregated utility function for the entire system. Once the system determines in process block 1030 that there are no additional levels, control passes to block 1040 and the aggregated utility function can be used to operate the system. Additional details regarding the calculation of aggregated utility functions is discussed below.

III. System Modeling and Decomposition

Consider a power distribution system similar to system 200 of FIG. 2 with N nodes, where node 0 represents a distribution substation connected to a transmission network. A coordinator can be located at the substation (node 0) and can direct interact with a number of aggregators that are distributed throughout the distribution system. Each aggregator can communicate with various DERs under its authority to realize resource aggregation and control. This distribution system can be abstracted by a tree graph denoted by $\mathcal{G}=(\mathcal{V}, \varepsilon)$, where $\mathcal{V}=\{0\}\cup\mathcal{N}$ with $\mathcal{N}=\{1,2,\ldots,N-1\}$ denotes the set of nodes and $\varepsilon \subset \mathcal{V}\times\mathcal{V}$ denotes the set of distribution lines connecting different nodes. Individual aggregators can be abstracted by a tree graph denoted by $\mathcal{G}_m=(\mathcal{V}_m, \varepsilon_m)$, m=1, ..., M, where $\mathcal{G}_m$ is connected, $\mathcal{V}_m \subset \mathcal{N}$ are disjoint sets from each other and $\varepsilon_m \subset \mathcal{V}_m \times \mathcal{V}_m$. Furthermore, let node $i_m \in \mathcal{V}_m$ denote the root of $\mathcal{G}_m$.

For each node $i \in \mathcal{V}$, let $p_i \in \mathbb{R}$ and $q_i \in \mathbb{R}$ denote the negative of net real and reactive power injections, respectively, and let $v_i \in \mathbb{C}$ with $v_i = V_i \angle \theta_i$ denote the phasor for the lin-to-ground voltage. For each distribution line $(i,j) \in \varepsilon$, let $r_{ij}$ and $x_{ij}$ denote the line resistance and reactance, respectively. Although it is more appropriate to consider the unbalanced three-phase distribution system, the subsequent framework development is based on the following balanced single-phase-equivalent power flow model for notational convenience and descriptive simplicity, $$p_i = V_i \Sigma_{j \in \mathcal{V}_{j \to i}} V_j (g_{ij} \cos \theta_{ij} + b_{ij} \sin \theta_{ij}) \quad \text{(Eq. 1a)}$$

$$q_i = -V_i \Sigma_{j \in \mathcal{V}_{j \to i}} V_j (g_{ij} \sin \theta_{ij} + b_{ij} \cos \theta_{ij}) \quad \text{(Eq. 1b)}$$

where $\theta_{ij} = \theta_i - \theta_j$, and $g_{ij} + ib_{ij} = (r_{ij} + ix_{ij})^{-1}$. However, the following results should be readily extended to account for the unbalanced three-phase power flow model. For the system downstream of each node $i \in \mathcal{V}_m$, where various DERs such as controllable loads, distributed generators, and photovoltaic (PV) systems are connected, the associated power flow constraints are assumed to be neglected.

In the example of FIG. 2, a hierarchical structure is disclosed to facilitate the large-scale integration of various DERs into distribution systems. Under the disclosed framework, the DER coordination and control is realized in two stages. At the scheduling stage of slow time scale, the coordinator 232 sets up an energy market to realize optimal resource allocation by solving an optimization problem with information provided by individual aggregators. Then, the coordinator sends the optimal dispatch signals to the aggregators, which further disaggregate the signals and send them to the DERs under their authority. At the operation stage of fast time scale, individual DERs carry out real-time control to follow the optimal dispatch signals. At the same time, various DERs that are capable of reactive power control will be systematically coordinated to maintain the nodal voltage profile within permissible ranges in the presence of operation uncertainties.

IV. Device-Level Control

When participating in the energy market, individual DERs are considered as self-interested agents with local objectives. They can be automated to perform local control actions by interacting with other agents through the market aiming to maximize their local benefits. This local objective can be modeled as a surplus maximization problem. In some examples, individual DERs can be price-taking agents, such that the decisions made by individual agents will not significantly affect the market price. This is a standard assumption when the market involves a large number of market participants. Disclosed below are device level controls for three different types of DERs, namely controllable loads, distributed generators, and PV systems.

a. Controllable Load

For the k-th controllable load connected to node i, k=1, ..., $N_{mi}^L$, the surplus maximization problem is given by $$(\mathcal{P}_{DER,L}) \max_{p_{ik,L}} U_{ik,L}(p_{ik,L}) - \lambda_i p_{ik,L} \quad \text{(Eq. 2a)}$$

$$\text{subject to } (p_{ik,L}, q_{ik,L}) \in \Omega_{ik,L} \quad \text{(Eq. 2b)}$$

where $U_{ik,L}(\cdot)$ is the utility function characterizing the satisfaction of energy consumption, $\lambda_i$ denotes the energy price at node i, and $\Omega_{ik,L}$ denotes the feasible set of real and reactive power, $p_{ik,L}$ and $q_{ik,L}$, of the controllable load. For controllable loads, the feasible set $\Omega_{ik,L}$ is usually in the following form, $$\Omega_{ik,L}(\lambda_i) = \underset{p_{ik,L}}{\operatorname{argmax}}\, U_{ik,L}(p_{ik,L}) - \lambda_i p_{ik,L}$$

Then the local controller has to maintain the power consumption, $p_{ik,L}$ to follow $p_{ik,L}^*$. However, there are two critical challenges associated with local controller design for controllable loads. The first challenge is that the energy consumption of controllable loads with discrete instantaneous power cannot be directly controlled and is often affected by other inputs. It is important to determine locally acceptable control inputs so that controllable loads can follow the optimal dispatch signals obtained at the scheduling stage. The second challenge is that it is not straightforward to determine the required utility functions of controllable loads for market participation. To accurately characterize utility functions, it is necessary to quantitatively relate the marginal utility of individual customers for power consumption to the local control input based on the preferences of individual customers. That is, local controller design has to be linked with individual economic preferences so that control decisions can be driven by the economic signal.

b. Distributed Generator

For the k-th distributed generator connected to node i, k=1, . . . , $N_{mi}^G$, the surplus maximization problem is given by $$(\mathcal{P}_{DER,G}) \max_{p_{ik,G}} \lambda_i p_{ik,G} - C_{ik,G}(p_{ik,G}) \quad \text{(Eq. 3a)}$$

$$\text{subject to } (p_{ik,G}, q_{ik,G}) \in \Omega_{ik,G} \quad \text{(Eq. 3b)}$$

where $C_{ik,G}(\cdot)$ is the cost function characterizing the cost of energy production, $\lambda_i$ denotes the energy price at node i, and $\lambda_{ik,G}$ denotes the feasible set of real and reactive power, $p_{ik,G}$ and $q_{ik,G}$, of the distributed generator. When $\lambda_i$ is received from the m-th aggregator, where $i \in \mathcal{V}_m$, the desired power generation can be determined by solving $\mathcal{P}_{DER,G}$ defined in Eq. 3 as $$p_{ik,G}^*(\lambda_i) = \underset{p_{ik,G}}{\mathrm{argmax}} \lambda_i p_{ik,G} - C_{ik,G}(p_{ik,G})$$

It is straightforward for distributed generators to follow the desired power generation $p_{ik,G}^*$ because their generation level can be continuously adjusted by well-established controllers. Furthermore, it is also simple to determine the cost functions of distributed generators based on easily identified factors such as generator operational cost, fuel efficiency, and fuel cost.

c. PV System

For the k-th PV system connected to node i, k=1, . . . , $N_{mi}^I$, the surplus maximization problem is given by $$(\mathcal{P}_{DER,I}) \max_{p_{ik,I}} \lambda_i p_{ik,I} \quad \text{(Eq. 4a)}$$

$$\text{subject to } (p_{ik,I}, q_{ik,I}) \in \Omega_{ik,I} \quad \text{(Eq. 4b)}$$

where $\lambda_i$ denotes the energy price at node i, and $\Omega_{ik,I}$ denotes the feasible set of real and reactive power, $p_{ik,I}$ and $q_{ik,I}$, of the PV system. For PV systems, the feasible set $\Omega_{ik,I}$ is usually of the following form, $$\Omega_{ik,I} = \left\{ (p_{ik,I}, q_{ik,I}) \,\middle|\, \begin{array}{l} 0 \leq p_{ik,I} \leq p_{ik,I}^{max} \\ p_{ik,I}^2 + q_{ik,I}^2 \leq s_{ik,I}^2 \end{array} \right\}$$

where $p_{ik,I}^{max}$ is the forecasted maximal power, and $s_{ik,I}$ is the capacity of the PV inverter. It is clear that the solution to the problem ($\mathcal{P}_{DER,I}$) is $p_{ik,I} = p_{ik<I}^{max}$. It implies that PV systems would like to maximize solar power extraction under all conditions, which can be achieved by applying the technique of maximum power point tracking (MPPT).

V. Aggregator-Level Aggregation

At the scheduling stage, individual DERs send energy bids along with constraints to an aggregator in order to participate in the energy market. Then the aggregator aggregates individual information together to obtain the aggregator-level energy bid and constraint, which will be finally sent to the coordinator for market clearing. Let $p_{im}$ and $q_{im}$ denote the real and reactive power flow from node $i_m$ into the m-th aggregator, respectively. That is, $$p_{im} + iq_{im} = \sum_{h \in \mathcal{V}_{im}} v_{im} \left( \frac{v_{im} - v_h}{r_{imh} + ix_{imh}} \right)^*,$$

where $\mathcal{V}_{im} = \{h: (i_m, h) \in \varepsilon_m\}$ and $(\cdot)^*$ denotes the complex conjugate. The information aggregation at the aggregator level is achieved by solving the following optimization problem, $$(\mathcal{F}_{aggregator}) \max_{p_{il}} \Sigma_{i \in Vm} U_i(p_i) - \lambda_{im} p_{im} \quad \text{(Eq. 5a)}$$

$$\text{subject to } (1a) - (1b), \forall i, j \in \mathcal{V}_m, \quad \text{(Eq. 5b)}$$

$$v_i^{min} \leq v_i \leq v_i^{max} \quad \text{(Eq. 5c)}$$

$$l_{ij}^{min} \leq |l_{ij}(v_i, v_j)| \leq l_{ij}^{max} \quad \text{(Eq. 5d)}$$

$$(p_i, q_i) \in \Omega_i, \quad \text{(Eq., 5e)}$$

where $l_{ij}(v_i, v_j) \in \mathbb{C}$ denotes the line flow from node i to node j. In the above optimization problem $\mathcal{P}_{aggregator}$, $U_i(\cdot)$ denotes the aggregated utility function derived from energy bids received from individual DERs under node i, $\lambda_{im}$ is the energy price received from the DSO, and $p_i$ and $q_i$, are calculated as $$p_i = -\Sigma_{k=1}^{N_{mi}^G} p_{ik,G} - \Sigma_{k=1}^{N_{mi}^I} p_{ik,I}^{max} + \Sigma_{k=1}^{N_{mi}^L} p_{ik,L} + p_{i,L}^{uc} \quad \text{(Eq. 6)}$$

$$q_i = -\Sigma_{k=1}^{N_{mi}^G} q_{ik,G} - \Sigma_{k=1}^{N_{mi}^I} q_{ik,I} + \Sigma_{k=1}^{N_{mi}^L} q_{ik,L} + q_{i,L}^{uc} \quad \text{(Eq. 6)}$$

where $p_{i,L}^{uc}$ and $q_{i,L}^{uc}$ are the forecasted uncontrollable real and reactive power, respectively, and $\Omega_i$ is the aggregated feasible set for $p_i$ and $q_i$ defined as $\Omega_i = \Omega_{i,G} \uplus \Omega_{i,I} \uplus \Omega_{i,L}$ with $$\Omega_{i,b} = \biguplus_{k=1}^{N_{mi}^b} \Omega_{ik,b}, b \in \{G, I, L\},$$

where $\uplus$ denotes the Minkowski sum. By solving $\mathcal{P}_{aggregator}$ for each given price $\lambda_{im}$ received from the DSO, the relationship between $p_{im}$ and $\lambda_{im}$ can be determined, which leads to the utility function $U_{im}(p_{im})$ of the m-th aggregator.

VI. DSO-Level Coordination

At the scheduling stage, the DSO sets up an energy market in order to realize optimal resource allocation among various DERs in the distribution system. To proceed, the distribution system $\mathcal{G}_m$ under the authority of the m-th aggregator is replaced by node $i_m$ in the distribution system. Then the set of nodes for the reduced distribution system is defined as $$\mathcal{V}_d = \left( \mathcal{V} \setminus \left( \bigcup_{m=1}^{M} \mathcal{V}_m \right) \right) \cup \{i_1, i_2, \ldots, i_M\}.$$

Recall that $p_{im}$ and $q_{im}$ are the negative of net real and reactive power injections, respectively, at node $i_m$. Let $p_0$ and $q_0$ denote the real and reactive power flow from node 0 into the DSO, respectively. That is, $$p_o + iq_0 = \sum_{h \in \mathcal{V}_0} v_0 \left( \frac{v_0 - v_h}{r_{0h} + ix_{0h}} \right)^*,$$

where $\mathcal{V}_0 = \{h:(0,h) \in \varepsilon\}$. Then the market clearing is equivalent to solving the following optimization problem, $$(\mathcal{P}_{DSO}) \max_{p_{im}} \Sigma_{i \in \mathcal{V}d} U_{im}(p_{im}) - \lambda_0 p_0 \quad \text{(Eq. 8a)}$$

subject to $(1a)-(1b), \forall i, j \in \mathcal{V}d$, (Eq. 8b)

$v_i^{min} \leq v_i \leq v_i^{max}$ (Eq. 8c)

$l_{ij}^{min} \leq |l_{ij}(v_i, v_j)| \leq l_{ij}^{max}$ (Eq. 8d)

$l_{ij}^{min} \leq |l_{ij}(v_i, v_j)| \leq l_{ij}^{max}$ (Eq. 8d)

$(p_i m, q_{mi}) \in \Omega_i m,$ (Eq., 8e)

where $\lambda_0$ is the locational marginal price (LMP) received from the wholesale market at the aggregator level. The above optimization problem can then be solved again for each higher level of the framework until the ISO level is reached. Market clearing can then occur at the ISO level or at any intermediate level, depending on the specific problem under consideration. This provides flexibility by allowing the optimization problem to continue up to any level desired.

The optimization problem ($\mathcal{P}_{DSO}$) can actually be solved using two different methods. That is, there exist two distinct ways for market clearing at the DSO level or any other level.

a. Centralized Market Clearing

When there is no privacy issue between individual aggregators and the DSO, the market clearing can be achieved in a centralized way. In this case, individual aggregators are willing to share local information with the DSO. They will directly submit to the DSO the aggregated utility function $U_{im}(\cdot)$ and feasible set $\Omega_{im}$ that by solving the optimization problem $\mathcal{P}_{aggregator}$ based on the information received from aggregators. Then the DSO will solve the optimization problem $\mathcal{P}_{DSO}$ by itself and determine the nodal prices $\lambda_{im}$. After that, the DSO will send these prices back to individual aggregators so that they can solve the optimization problem $\mathcal{P}_{aggregator}$ to obtain disaggregated dispatch signals for various DERs under their authority.

b. Distributed Market Clearing

When there is privacy issue between individual aggregators and the DSO, the market clearing has to be achieved in a distributed way. In this case, individual aggregators would like to preserve local privacy and, thus, do not want to share the aggregated utility function $U_{im}(\cdot)$ and feasible set $\Omega_{im}$ with the DSO. Hence, the DSO does not have all the required information to solve the optimization problem ($\mathcal{P}_{DSO}$) by itself. Instead, the DSO will initialize the nodal prices $\lambda_{im}$ and send them to the individual aggregators. After solving $\mathcal{P}_{aggregator}$ based on the received $\lambda_{im}$, individual aggregators will send the net real power injection $p_{im}$ and the corresponding feasible set of $q_{im}$ back to the DSO. Based on this feedback information, the DSO will update the nodal prices $\lambda_{im}$ in order to reduce the mismatch, and send the new prices to individual aggregators again. This process will be repeated until all the nodal prices $\lambda_{im}$ converge. Then individual aggregators can finally solve the optimization problem $\mathcal{P}_{aggregator}$ to obtain disaggregated dispatch signals for various DERs under their authority.

c. Computational Challenges

When applying the proposed theoretical framework to the practical distribution systems, there is a common computational challenge to solving both $\mathcal{P}_{aggregator}$ and $\mathcal{P}_{DSO}$. This challenge is due to the non-convex feasible regions associated with nonlinear power flow equations defined in equation (1). In order to overcome this challenge, different representations of power flow equations have to be considered. In fact, the power flow of a distribution system can be described by the following angle-relaxed branch flow model, $$p_{ij} = \Sigma_{h:(j,h) \in \varepsilon} p_{jh} + p_j + r_{ij} L_{ij} \quad \text{(Eq. 9a)}$$

$$q_{ij} = \Sigma_{h:(j,h) \in \varepsilon} q_{jh} + q_j + x_{ij} L_{ij} \quad \text{(Eq. 9b)}$$

$$V_i^2 - V_j^2 = 2(r_{ij} p_{ij} + x_{ij} q_{ij}) - (r_{ij}^2 + x_{ij}^2) L_{ij} \quad \text{(Eq. 9c)}$$

$$L_{ij} = \frac{p_{ij}^2 + q_{ij}^2}{V_i^2},$$

where $p_{ij}$ and $q_{ij}$ are the active and reactive power flows along the distribution line $(ij) \in \varepsilon$, $p_j$ and $q_j$ are defined in (6) and (7), respectively, and $L_{ij} = |I_{ij}|$ is the squared current magnitude. It has been shown that the above relaxation (dropping the angle information in voltage) is exact for radial distribution systems with tree topology. It is worth mentioning that, even though the above angle-relaxed branch flow model is still nonlinear (and non-convex) in the decision variables, all optimization problems $\mathcal{P}_{aggregator}$ and ($\mathcal{P}_{DSO}$) can be solved with this model. Particularly, it has been shown that the convex relaxation replacing (9d) by $$L_{ij} \geq \frac{p_{ij}^2 + q_{ij}^2}{V_i^2}$$

is exact for optimal power flow problems.

VII. Real-Time Voltage Control

The optimal solution to the above optimization problems $\mathcal{P}_{DSO}$, $\mathcal{P}_{aggregator}$ and ($\mathcal{P}_{DER}$) associated with the energy market defines the scheduled operating point of the distribution system for each scheduling period. However, the actual operating point may deviate from the scheduled one due to the high volatility of renewable energy, inaccurate prediction of uncontrollable load consumptions, or unexpected contingency events. In particular, the nodal voltages will inevitably deviate from the scheduled operating point, and even become unstable in the worst case. Hence, it is necessary to deploy appropriate (centralized or distributed) Volt/VAR control strategies to maintain the stable and reliable system operation.

The fundamental objective of the local Volt/VAR control problem is to stabilize the nodal voltages of the distribution system, and has been studied extensively in the literature. In practice, reactive power injection into the distribution system plays a major role in helping regulate the voltage profile. Traditionally, the on-load tap changers, capacitor banks and shunt capacitor pre-installed in the distribution system are controlled to provide reactive power support. However, these traditional devices can only be operated in several discrete modes and are relatively inaccurate. Very recently, with the increasing penetration of renewable energy resources (e.g., wind and solar), the idea of using inverters associated with these DERs to provide reactive power support has been investigated.

In order to facilitate the development of computationally tractable Volt/VAR control strategies, a linearized approximation of the nonlinear power flow equations (1) is often utilized in the literature. Note that the angle-relaxed branch flow model (9) can be linearized by assuming that the loss over each line $(ij) \in \varepsilon$ is negligible, i.e. $r_{ij}L_{ij} \approx 0$ and $x_{ij}L_{ij} \approx 0$ and the voltage profiles across the distribution system is relatively flat, i.e. $V_i \approx 1$ in per unit. Hence, the resulted linearized power flow equations are given by $$p_{ij} = \Sigma_{h:(j,h) \in \varepsilon} p_{jh} + p_j \qquad (Eq.\ 10a)$$

$$q_{ij} = \Sigma_{h:(j,h) \in \varepsilon} q_{jh} + q_j \qquad (Eq.\ 10b)$$

$$V_i - V_j = r_{ij}p_{ij} + x_{ij}q_{ij}, \qquad (Eq.\ 10c)$$

which can be written in the following compact form, $$V = R_p + X_q + V_0,$$

where R and X are constant matrices depending only on the configuration of the distribution system, V, p, and q are the stacked vectors of voltage magnitudes, active power and reactive power, respectively, and Vo is the vector with all the elements equal to the voltage magnitude of node 0. This simplification is primarily introduced for the Volt/VAR control design and has been widely adopted. Let $q_I$ denote the vector of controllable reactive power at individual nodes. The relationship between $q_I$ and the voltage profile V of the distribution system can be modeled as $$V = X_{q_I} + \tilde{V}, \qquad (Eq.\ 11)$$

where $\tilde{V}$ denotes the voltage profiles without any reactive power control in the system.

The Volt/VAR control problem seeks to determine a control policy u for controllable reactive power so that the following dynamical system has a stable equilibrium, $$\begin{cases} V(k+1) = X_{q_I}(k+1) + \tilde{V} \\ q_I(k+1) = u(q_I(k), V(k); V^*), \end{cases}$$

where k denotes the discrete time, and $V^*$ is the vector of optimal nodal voltages specified by the scheduled operating point. Currently, most existing works focus on fully decentralized (local) control policies, i.e.

$$q_{i,I}(k+1) = u_i(q_{i,I}(k), V_i(k); V_i^*).$$

One extensively studied control policy is the so-called droop-like controller which is given by $$q_{i,I}(k+1) = [-K_i(V_i(k) - V_i^*)]_{q_{i,I}^{min}}^{q_{i,I}^{max}},$$

where $K_i$ is the gain to be determined and $[x]_a^b$ is the projection of x into the interval [a,b]. This type of controller actually complies with the IEEE 1547.8 standard. However, it has been shown that this droop like controller may result in unstable trajectories of voltage profile for inappropriate choices of $K_i$'s and the conditions guaranteeing stable voltage profile are somewhat restrictive.

More recently, an incremental controller has been proposed, which can be considered as the algorithm to solve the following optimization problem, $$\min_{q_{i \in [q_I^{min}, q_I^{max}]}} \|V - V^*\|_{X^{-1}}^2 + C(q_I) \qquad (Eq.\ 12a)$$

$$\text{subject to (11)} \qquad (Eq.\ 12b)$$

where $\|\cdot\|_{X^{-1}}^2$ is the Euclidean norm scaled by matrix $X^{-1}$, and $C(\cdot)$ is commonly a quadratic function capturing the cost of reactive power injection. It has been shown that the above problem naturally admits fully decentralized algorithms, which can be selected as the control policy. This type of controller allows for a less restrictive convergent condition and provides a much faster convergence speed.

VIII. Stabilizing Oscillations in Energy Market

Figure 11:
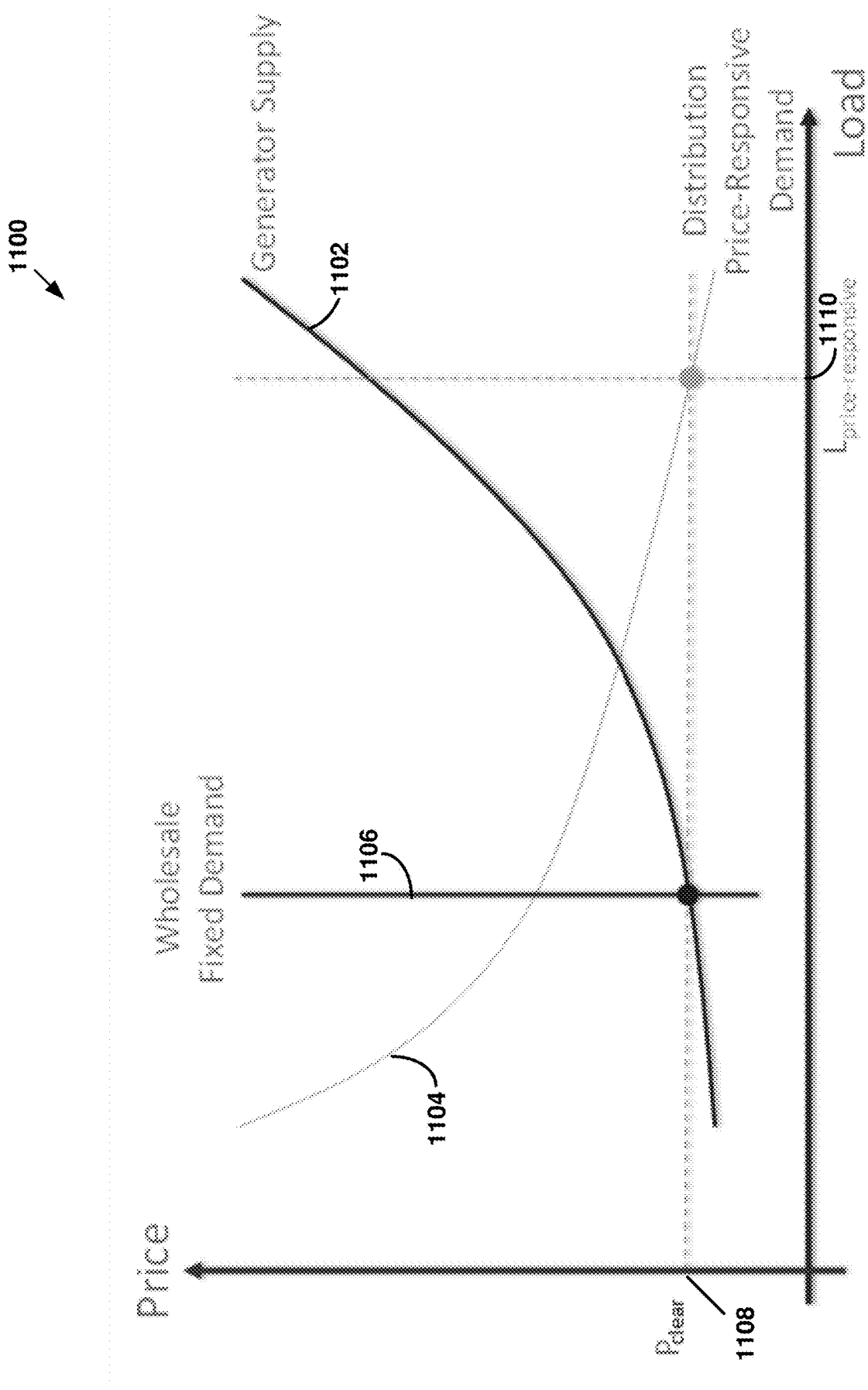
FIGS. 11-12 illustrate charts demonstrating the cobweb effect in a transactive energy market.
Figure 12:
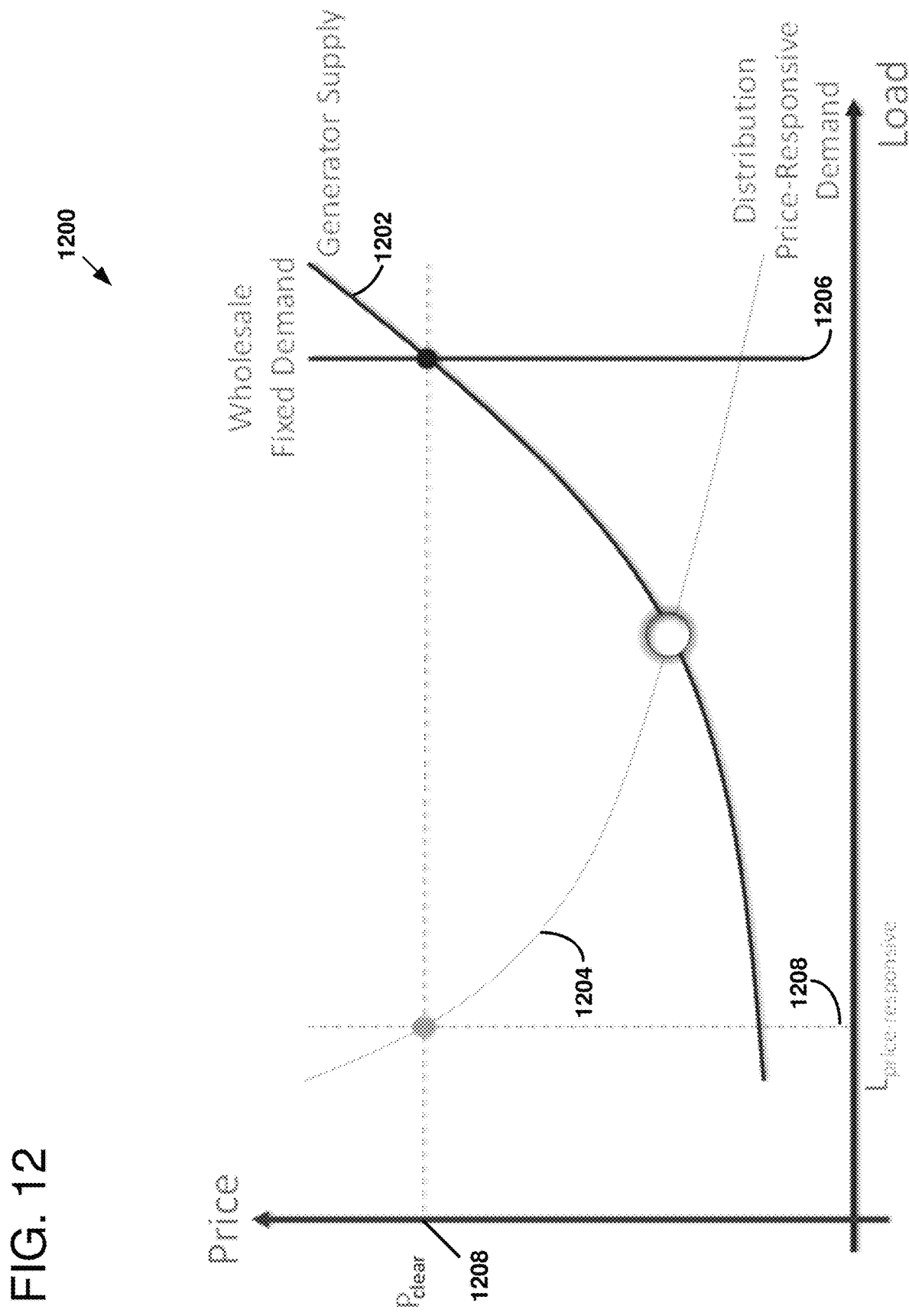

As described above, an aggregated utility function for an energy network or sub-network can be determined that relates energy produced or consumed to energy price. However, an incomplete expression of the price-responsiveness of loads when the energy market clears can lead to the economic phenomenon known as the "cobweb" effect. FIGS. 11 and 12 illustrate the cobweb effect in an example transactive energy market.

FIG. 11 is a chart 1100 showing a generator supply curve 1102 relating price to energy produced by a market operator (e.g., coordinator 532 of FIG. 5) and a demand curve 1104 relating price to energy consumed by one or more loads (e.g., the plurality of resources of the resource level 510 of FIG. 5). As demand curve 1104 illustrates, as price increases, demand of the loads in the system decreases. However, if the market operator incorrectly does not know the characteristics of the demand curve and instead assumes that demand is non-price responsive, the operator may believe that the actual demand curve is represented by vertical line 1106. This can cause the operator to set the price at point 1108. When this price is communicated to the price-responsive loads, the relatively low price can cause the loads to increase their consumption to the level 1110.

FIG. 12 is a chart 1200 showing a similar supply curve 1202 and demand curve 1204 for the power system discussed in connection with FIG. 11 in a second half of a cycle after the occurrence of the events discussed with respect to FIG. 11. As mentioned above in connection with FIG. 11, due to the low price set by the market operator, the loads in the system are now operating at level 1206 and the market operator sets a clearing value (e.g., a market clearing price) at level 1208. This relatively high price causes the loads to reduce their demand to level 1208, which is the level that the example of FIG. 11 began at. Thus, the system can cycle repeatedly between these two states, leading to the cobweb effect. In some examples, this can lead to oscillations that will decrease over time. However, in other examples, this can lead to oscillations that will not decrease over time causing the system to become unstable.

This cobweb effect is not an ideal way for a power system to be operated. As explained above, the issue arises when a market operator improperly determines the price-responsiveness of the loads in the system. Therefore, this problem can be avoided if the actual demand curve of the loads in the system is communicated to the market operator. It has historically been difficult for a market operator to effectively communicate with a large number of loads. However, within the framework of system 500 of FIG. 5, the aggregator level 520 allows aggregators to directly communicate with each of the resources of the resource level 510. The resources can each submit a utility function to an aggregator and each aggregator can determine an aggregated utility function for one or more resources as described above. These aggregated utility functions can then be submitted to the coordinator 532, which can determine an overall aggregated utility function for the system. Thus, a correct demand curve can be known by the coordinator 532 such that the cobweb effect can be avoided.

Figure 13:
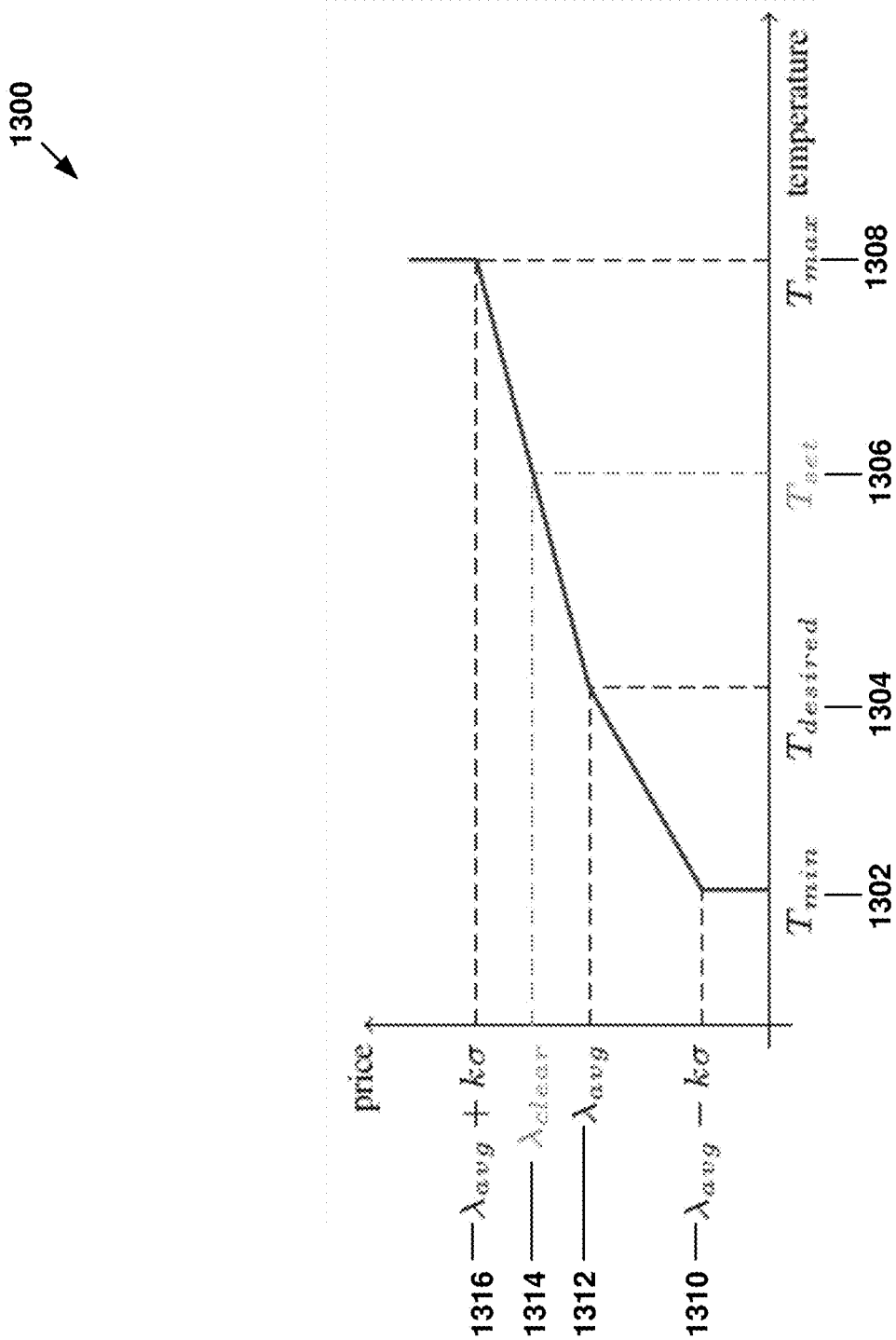
FIG. 13 illustrates an example response curve for an air conditioner.

An example response curve defining the relationship between a local control set-point and marginal for an example air condition (AC) unit is shown as a chart 1300 in FIG. 13. This curve can be determined by the parameters of the device and end-user preferences for indoor air temperature. Temperatures $T_{min}$ 1302 and $T_{max}$ 1308 can represent the minimum and maximum temperatures, respectively, allowed by the user. Temperature $T_{desired}$ 1304 can represent the ideal temperature set by the user. Price $\lambda_{avg}$ 1312 can denote the average clearing price over a certain time period (e.g., 24 hours). The value σ can represent the variance of the clearing price over the same time period and the gain k can measure the user's preference for cost over comfort, as described above. The clearing price can be denoted by $\lambda_{avg}$ 1312.

Figure 14:
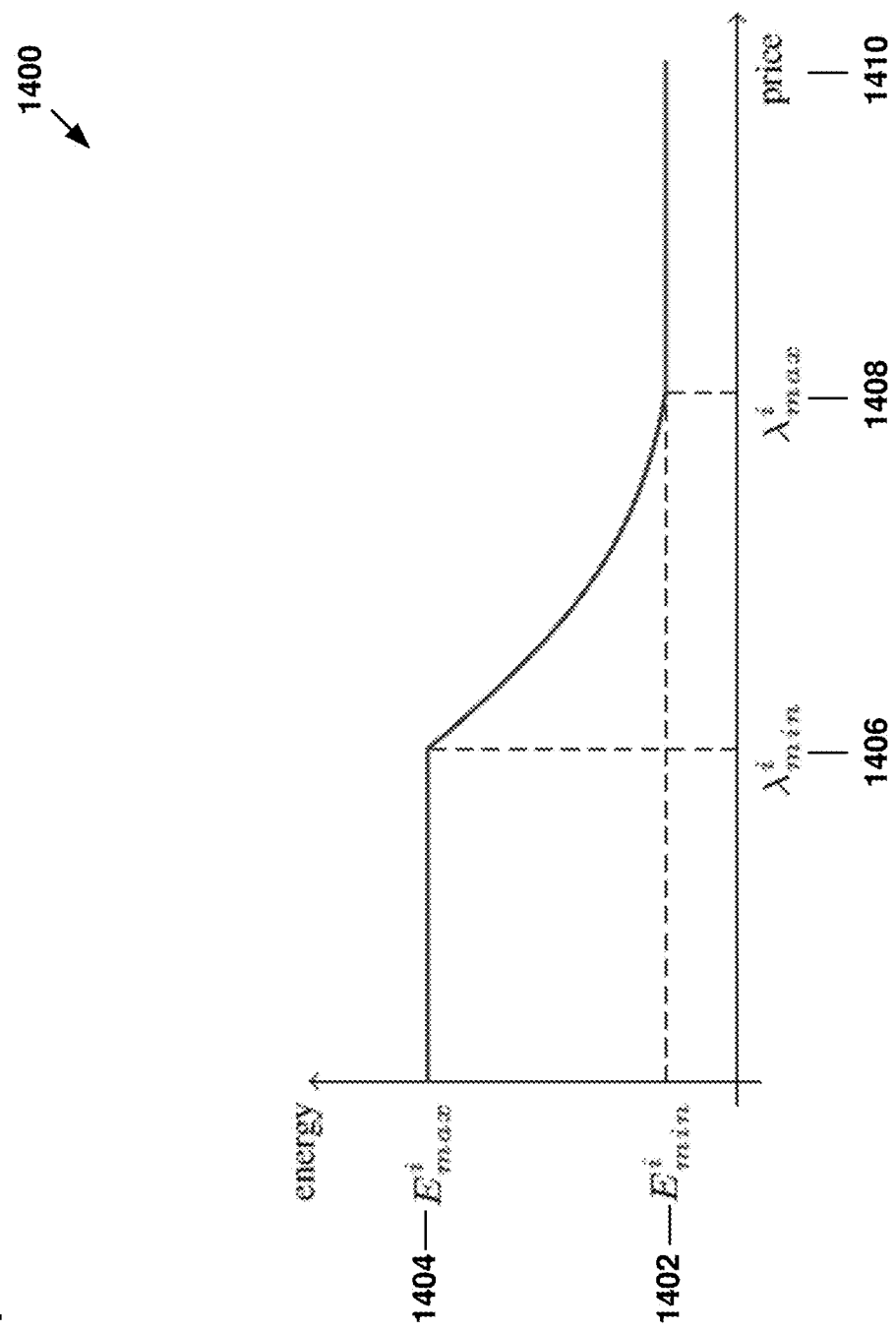
FIG. 14 illustrates an example demand curve for an air conditioner.

After a response curve for a device is defined mapping utility to air temperature setpoint, a demand curve for the device can be defined that maps energy consumption to energy price. This can be done by looking at the dynamics of the device, which can be described using an equivalent thermal parameter (ETP). If the parameters of the ETP model are known, it is straightforward to derive the relationship between indoor air temperature and energy demand. FIG. 14 is a chart 1400 showing an example demand curve for a given control period. Values $E_{max}^i$ 1404 and $\lambda_{min}^i$ 1406 correspond to the theoretical upper bound on energy consumption for device i. This corresponds to a situation where the device is on for the entire control cycle, yielding an energy consumption equal to the average power consumption. Similarly, values $E_{min}^i$ 1402 and $E_{max}^i$ 1408 correspond to the theoretical lower bound on energy consumption for device i. This corresponds to a situation where the device is off for the entire control cycle, yielding an energy consumption equal to zero.

Using the ETP model is straight forward, in both cases, to calculate the indoor air temperature trajectory. However, considering values between $\lambda_{min}^i$ and $\lambda_{max}^i$, no closed form expression exists. In this range, the device will only be on for a portion of the control period. A practical solution approximates the demand curve by a step function while assuming that $E_{min}^i$ is equal to zero. In this special case, the demand curve can be described by two parameters, namely the quantity bid ($E_{max}^i$) and the price bid $$\left( \lambda_{min}^i + \frac{\lambda_{max}^i - \lambda_{min}^i}{2} \right).$$

At the beginning of each control period, the aggregators of the aggregator level 520 of FIG. 5 can receive price and quantity bids from each of the resources of the resource level 510. These bids reflect the willingness of each device to consume energy and defines the price at which the device will be active. Each aggregator can form a complete demand curve for the devices it is responsible for by first summing up the individual demand bids as shown in the equation below.

$$P_{marginal}(Q) = \begin{cases} \sum_{n=0}^{N(Q)} p_i & \text{if } P(Q) < p_{cap} \\ p_{cap} & \text{if } P(Q) \geq p_{cap} \end{cases}$$

where P is the marginal price curve as a function of quantity Q, N(Q) is the number of bids at that quantity, and $p_{cap}$ is the market price cap for this market.

Figure 15:
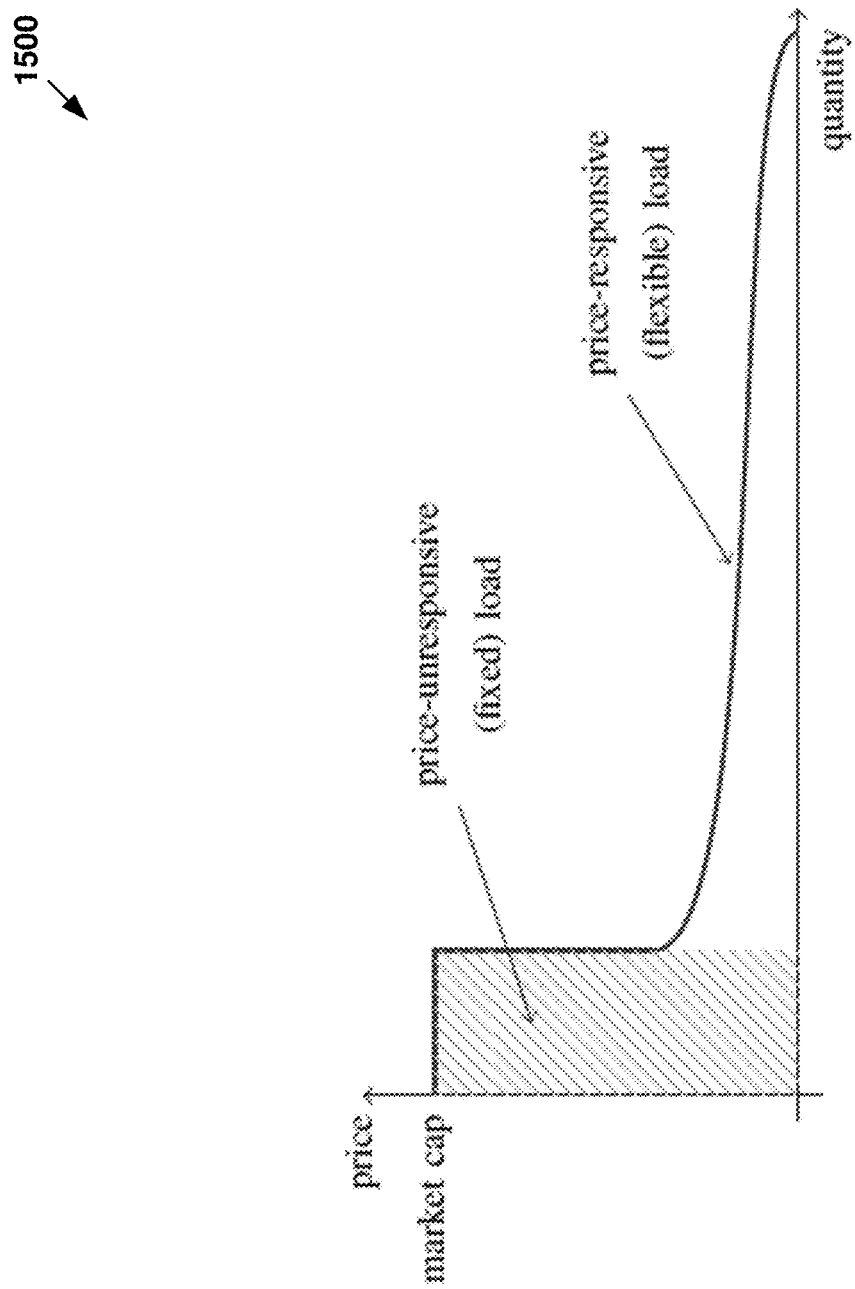
FIG. 15 illustrates an example marginal demand curve from individual bids from devices.
Figure 16:
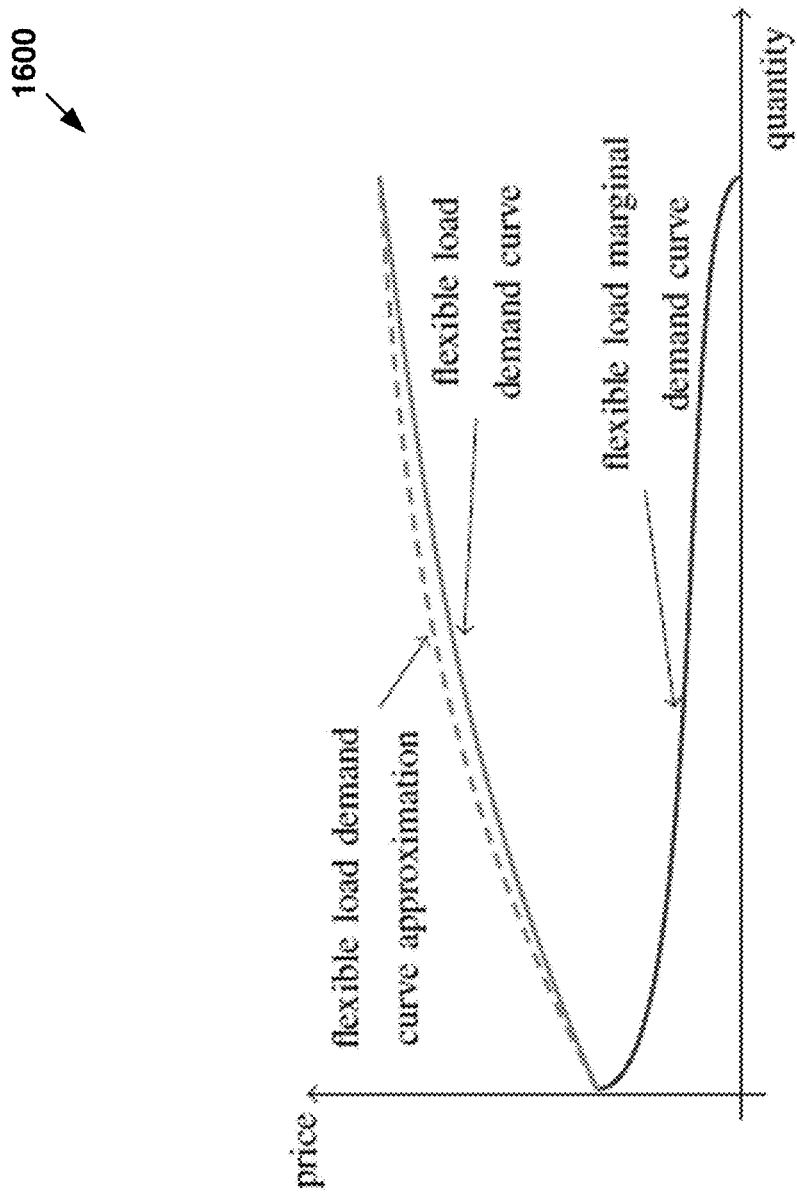
FIG. 16 illustrates a demand curve from individual bids by devices.

The price-quantity demand curve that is formed by the above equation, an example of which is shown in a chart 1500 of FIG. 15, is a marginal demand curve. That is, FIG. 15 shows how much each device is willing to pay to run during the next market period. Devices that bid the market cap are shown in the shaded region of FIG. 15. Since these devices must run during the next market period and are no longer price-responsive, they are removed from the marginal demand curve, thereby shifting the demand curve left. To convert a marginal demand curve to a demand curve, the integral (or summation when the existing curve was formed from discrete bids) is taken as shown in the equation below.

$$P(Q) = \sum_{q=0}^{q=Q} P_{marginal}(Q)$$

where P is the demand curve as a function of quantity (Q), and $P_{marginal}(Q)$ al is the margin demand curve formed after removing the market cap bids. A quadratic curve is fit to this demand curve and submitted to the wholesale market as price-responsive load demand curve, an example of which is shown in a chart 1600 of FIG. 16.

The majority of the load in each circuit, though, is not price-responsive. When being submitted to the wholesale market, this fixed load's price curve is a vertical line on the price-quantity plane where only the quantity must be defined. Since not all price-responsive loads interact with an aggregator, this quantity can be estimated by first making the simplifying assumption that all flexible devices that are currently running will be flexible during the next market period. Using the flexible device state, which is also submitted with the bid, an aggregator can subtract the quantity of energy for all flexible devices currently running from the current measured total load for the circuit.

IX. Example Method of Aggregator Operation

Figure 17:
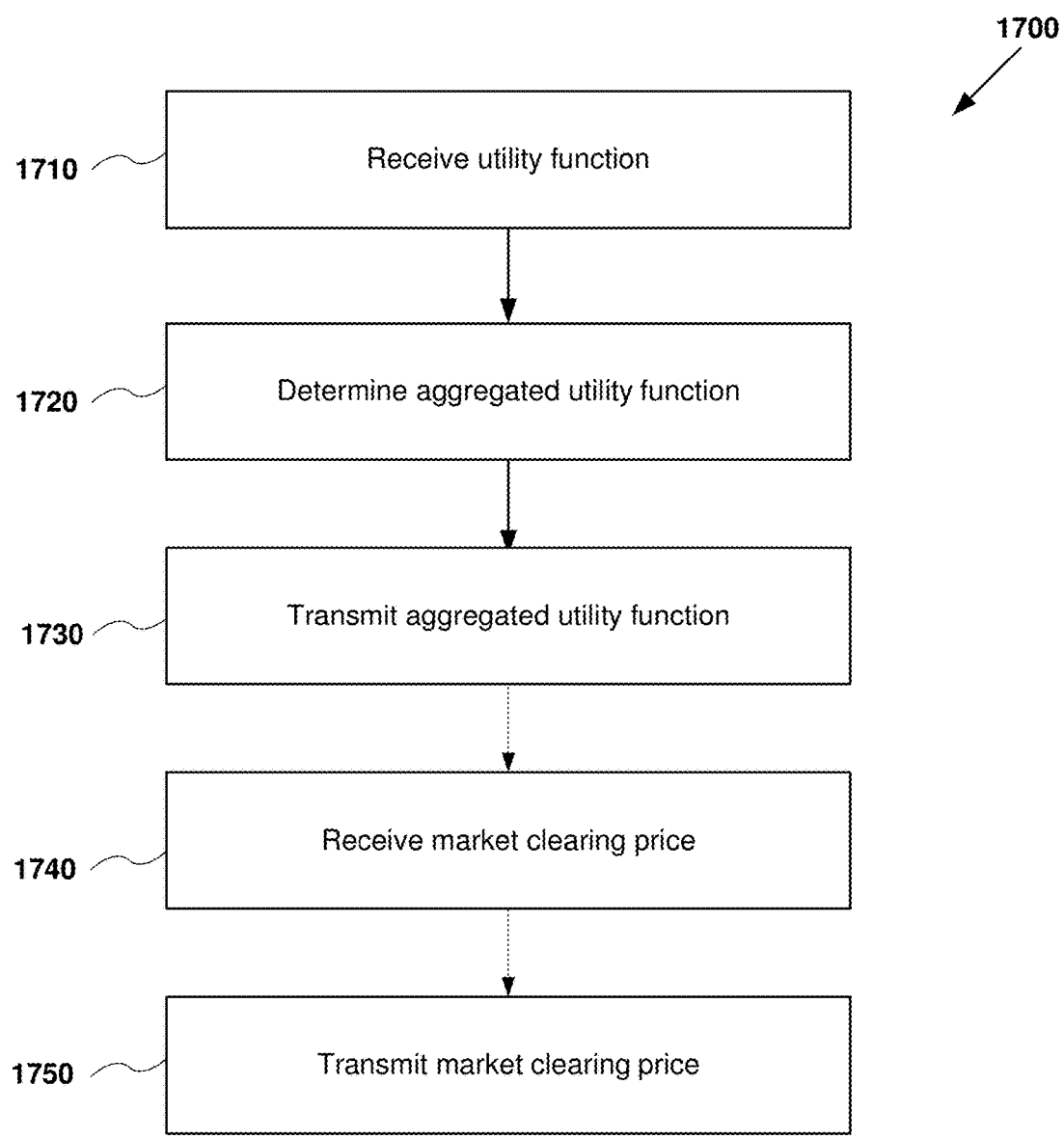
FIG. 17 illustrates an example method of operating an aggregator, as can be performed in certain examples of the disclosed technology.

FIG. 17 is a flowchart 1700 outlining an example method of operating an aggregator as can be performed in certain examples of the disclosed technology. For examples, the depicted method can be performed by the aggregators 522, 524, and/or 526 of system 500. In other examples, different configurations of aggregators are used to implement the illustrated method.

At process block 1710, an aggregator receives a utility function from each of a plurality of resources or resource controllers. The utility function can be received by any suitable communication network, including wired connections (e.g., megabit or gigabit Ethernet, Infiniband, Fibre Channel over electrical or fiber optic connections, or powerline transceivers), wireless technologies (e.g., RF connections via Bluetooth, WiFi (IEEE 802.11a/b/n), WiMax, cellular, satellite, laser, infrared), and other suitable communication connections for providing a network connection for the disclosed controllers and coordinators implementing aggregators and resource controllers. Both wired and wireless connections can be implemented using a network adapter coupled to the aggregator or controller. The utility function can be can be a demand function that relates an amount of energy produced or consumed by a resource based on energy price. The demand function can be determined based on the preferences of the owner or operator of the resource. For example, the resource can be a thermostatically controlled load and the demand function can be based on settings that a user can enter to select between comfort and energy savings. The more this setting is weighted towards comfort, the more the resource will be willing to pay for energy. The more this setting is weighted towards energy savings, the less the resource will be willing to pay for energy.

At process block 1720, the aggregator determines an aggregated utility function based on the received utility functions. For example, this aggregated utility function can represent an aggregate demand curve for all the DERs under the authority of a particular aggregator. In some examples, the aggregated utility function is determined based on a demand function associating a total amount of energy produced or consumed by the plurality of distributed energy resources for all possible energy prices. In some examples, determining a demand function of the plurality of distributed energy resources is based on the amount of energy produced or consumed by the plurality of distributed energy resources at each possible price and integrating an inverse function of the determined demand function over a range of energy consumption levels from a minimum amount produced or consumed to a maximum amount produced or consumed.

At process block 1730, the aggregator transmits the determined aggregated utility function to a coordinator. For example, network adapters coupled to the aggregator or controller can be used to couple to a wired or wireless communications network to transmit the utility function.

At process block 1740, after transmitting an aggregated utility function to a coordinator, the aggregator receives a clearing value (e.g., a market clearing price) from the coordinator. Once the coordinator receives an aggregated utility function, it can use the received aggregated utility function to determine a clearing value (e.g., a market clearing energy price) and to send this clearing value back to the aggregators. In some examples, the clearing value can be determined by centralized market clearing. In other examples, distributed market clearing is used to determine a clearing value.

At process block 1750, the aggregator transmits the received clearing value to each of its associated resources or resource controllers. The aggregators can then relay the clearing value to each resource controller and each resource controller can determine whether or not to produce or consume energy based on the clearing value. For example, network adapters coupled to the aggregator or controller can be used to couple to a wired or wireless communications network to transmit the utility function.

X. Example Method of Resource Controller Operation

Figure 18:
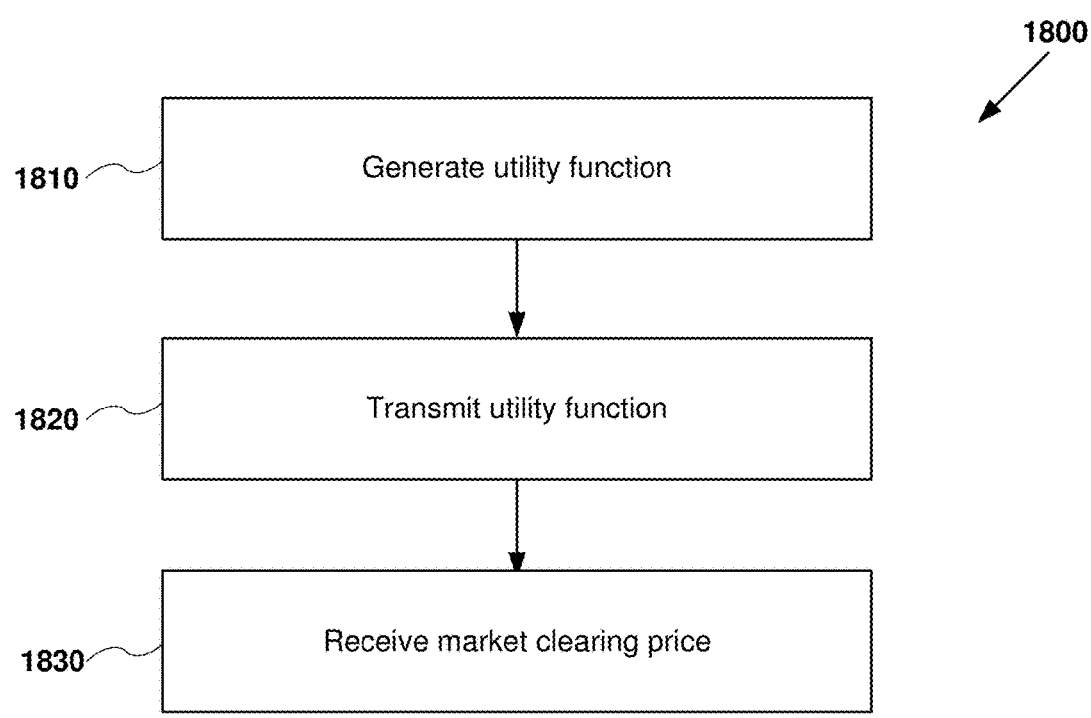
FIG. 18 illustrates an example method of operating a resource controller, as can be performed in certain examples of the disclosed technology.

FIG. 18 is a flowchart 1800 outlining an example method of operating a resource controller, as can be performed in certain examples of the disclosed technology. For example, the resource controller can be associated with a DER such as the controllers 513, 515, 517 of system 500. In other examples, different configurations of resource controllers are used to implement the illustrated method.

At process block 1810, the resource controller generates a utility function. This utility function can be a demand curve for the associated DER relating the amount of energy to be produced or consumed by the DER based on energy price. The utility function can be can be a demand function that relates an amount of energy produced or consumed by a resource based on energy price. The demand function can be determined based on the preferences of the owner or operator of the resource. For example, the resource can be a thermostatically controlled load and the demand function can be based on settings that a user can enter to select between comfort and energy savings. The more this setting is weighted towards comfort, the more the resource will be willing to pay for energy. The more this setting is weighted towards energy savings, the less the resource will be willing to pay for energy.

At process block 1820, the controller transmits the determined utility function to an associated aggregator. For example, network adapters coupled to the aggregator or controller can be used to couple to a wired or wireless communications network to transmit the utility function. Once the aggregator receives the utility function, it can use the received utility function and utility functions received from other such resource controllers to determine an aggregated utility function, as described above At process block 1830, after transmitting the utility function to an associated aggregator, the DER receives a market clearing energy price. The controller can then determine whether to consume or generate energy based on the received clearing value. For example, network adapters coupled to the aggregator or controller can be used to couple to a wired or wireless communications network to receive the market clearing energy price.

XI. Example Computing Environment

Figure 19:
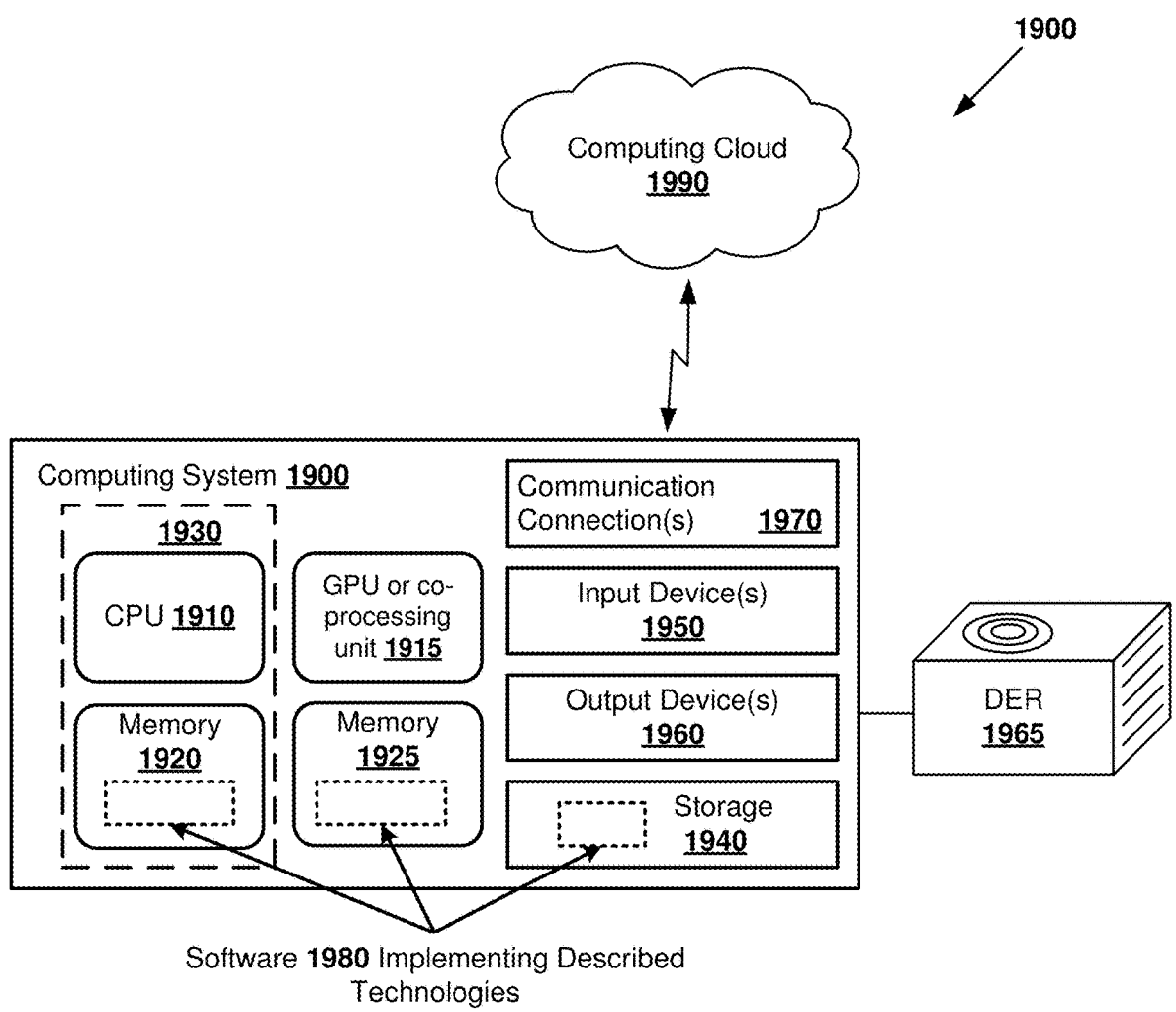
FIG. 19 illustrates an example computing environment in which certain examples of the disclosed technology can be implemented.

FIG. 19 illustrates a generalized example of a suitable computing environment 1900 in which described embodiments, techniques, and technologies, including determining an energy response, generating and sending bids, and market coordination can be implemented. For example, the computing environment 1900 can implement any of the TCL controllers, market coordinators, and/or market administrators, as described herein.

The computing environment 1900 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 19, the computing environment 1900 includes at least one central processing unit 1910 and memory 1920. In FIG. 19, this most basic configuration 1930 is included within a dashed line. The central processing unit 1910 executes computer-executable instructions and may be a real or a virtual processor. In a multi-processing system, multiple processing units execute computer-executable instructions to increase processing power and as such, multiple processors can be running simultaneously. The memory 1920 may be volatile memory (e.g., registers, cache, RAM), non-volatile memory (e.g., ROM, EEPROM, flash memory, etc.), or some combination of the two. The memory 1920 stores software 1980, images, and video that can, for example, implement the technologies described herein. A computing environment may have additional features. For example, the computing environment may include a graphics processing unit or other co-processing unit 1915, and additional removable memory 1925, which may be volatile or non-volatile. Further, the illustrated computing environment 1900 includes storage 1940, one or more input devices 1950, one or more output devices 1960, and one or more communication connections 1970. An interconnection mechanism (not shown) such as a bus, a controller, or a network, interconnects the components of the computing environment 1900. Typically, operating system software (not shown) provides an operating environment for other software executing in the computing environment 1900, and coordinates activities of the components of the computing environment 1900.

The storage 1940 may be removable or non-removable, and includes magnetic disks, magnetic tapes or cassettes, CD-ROMs, CD-RWs, DVDs, or any other medium which can be used to store information and that can be accessed within the computing environment 1900. The storage 1940 stores instructions for the software 1580, plugin data, and messages, which can be used to implement technologies described herein.

The input device(s) 1950 may be a touch input device, such as a keyboard, keypad, mouse, touch screen display, pen, or trackball, a voice input device, a scanning device, or another device, that provides input to the computing environment 1900. For audio, the input device(s) 1950 may be a sound card or similar device that accepts audio input in analog or digital form, or a CD-ROM reader that provides audio samples to the computing environment 1900. The input device(s) 1950 can also include sensors and other suitable transducers for generating data about the environment such as room temperature, humidity, and status information for one or more DERs (e.g., DER 1965). The output device(s) 1960 may be a display, printer, speaker, CD-writer, or another device that provides output from the computing environment 1900. The output device(s) 1960 can also include interface circuitry for sending actuating commands to the DER, (e.g., DER 1965), for example, to activate or deactivate actuators (e.g., motors, solenoids, hydraulic actuators, pneumatic actuators, etc.) the DER, or to request sensor or other data from the DER.

The communication connection(s) 1970 enable communication over a communication medium (e.g., a connecting network) to another computing entity. The communication medium conveys information such as computer-executable instructions, compressed graphics information, video, or other data in a modulated data signal. The communication connection(s) 1970 are not limited to wired connections (e.g., megabit or gigabit Ethernet, Infiniband, Fibre Channel over electrical connections, including in some cases using powerline transceivers, or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed controllers and coordinators. Both wired and wireless connections can be implemented using a network adapter. In a virtual host environment, the communication(s) connections can be a virtualized network connection provided by the virtual host. In some examples, the communication connection(s) 1970 are used to supplement, or in lieu of, the input device(s) 1950 and/or output device(s) 1960 in order to communicate with the TCLs and/or sensors.

Some embodiments of the disclosed methods can be performed using computer-executable instructions implementing all or a portion of the disclosed technology in a computing cloud 1990. For example, data acquisition and TCL actuation can be performed in the computing environment while computing energy response functions or bid generation can be performed on servers located in the computing cloud 1990.

Computer-readable media are any available media that can be accessed within a computing environment 1900. By way of example, and not limitation, with the computing environment 1900, computer-readable media include memory 1920 and/or storage 1940. As should be readily understood, the term computer-readable storage media includes the media for data storage such as memory 1920 and storage 1940, and not transmission media such as modulated data signals.

In view of the many possible embodiments to which the principles of the disclosed subject matter may be applied, it should be recognized that the illustrated examples are only preferred examples of the invention and should not be taken as limiting the scope of the claims to those preferred examples. Rather, the scope of the claimed subject matter is defined by the following claims. We therefore claim as our invention all that comes within the scope of these claims.

What is claimed is:

1. A method comprising:
   receiving, via a communication network coupled to a plurality of distributed energy resources, a respective utility function from each of at least two of the plurality of distributed energy resources, the respective received utility function representing an amount of energy produced or consumed by the respective associated distributed energy resource as a function of energy price;
   producing an aggregated utility function associated with the plurality of distributed energy resources based on the received utility functions;
   transmitting the produced aggregated utility function to a coordinator;

receiving a clearing value from the coordinator determined with the aggregated utility function; and transmitting the received clearing value to each of the plurality of distributed energy resources, wherein determining the aggregated utility function comprises:

determining a demand function of the plurality of distributed energy resources based on the amount of energy produced or consumed by the plurality of distributed energy resources at each possible price, and integrating an inverse function of the determined demand function over a range of energy consumption levels from a minimum amount produced or consumed to a maximum amount produced or consumed.

2. The method of claim 1, wherein the aggregated utility function is determined based on a demand function associating a total amount of energy produced or consumed by the plurality of distributed energy resources for all possible energy prices.

3. The method of claim 1, wherein at least one of the distributed energy resources is a load.

4. The method of claim 3, wherein the utility function associated with the at least one of the distributed energy resources relates energy consumed to energy price.

5. The method of claim 1, wherein at least one of the distributed energy resources is a distributed generator.

6. The method of claim 5, wherein the utility function associated with the at least one of the distributed energy resources relates energy produced to energy price.

7. The method of claim 1, wherein at least one of the received utility functions is determined by an end-user of its respective distributed energy resource.

8. The method of claim 1, wherein at least one of the received utility functions indicates an end-user's preference for cost over comfort for its respective distributed energy resource.

9. The method of claim 1, wherein at least one of the received utility functions is generated by a controller coupled locally to its respective distributed energy resource.

10. The method of claim 1, wherein at least one of the received utility functions is transmitted by a resource controller coupled to its respective distributed energy resource.

11. The method of claim 1, wherein the aggregated utility function is selected to attenuate or avoid the cobweb effect.

12. A system comprising:

a plurality of distributed energy resources being configured to transmit a utility function to at least one aggregation server, the utility function relating energy produced or consumed to energy price, the distributed energy resources being configured to determine whether to produce or consume energy based on a clearing value; and the at least one aggregation server being configured to:
determine a first aggregated utility function based on the transmitted utility function, the first aggregated utility function relating energy produced or consumed by all of the distributed energy resources to price, transmit the first aggregated utility function to a coordination server, the coordination server being configured to determine the clearing value based on each of a plurality of received aggregated utility functions comprising the first aggregated utility function and send the clearing value to the at least one aggregation server, and transmit the clearing value to the plurality of distributed energy resources.

13. The system of claim 12, wherein each aggregator is placed at a location where a voltage regulated transformer exists.

14. The system of claim 12, further comprising a plurality of controllers, wherein each controller is configured to control one of the distributed energy resources.

15. The system of claim 12, wherein at least one of the distributed energy resources is a load.

16. The system of claim 12, wherein at least one of the distributed energy resources is at least one distributed generator.

17. The system of claim 16, wherein the utility function associated with the at least one distributed generator relates energy produced to energy price.

18. The system of claim 12, wherein the at least one aggregation server determines the first aggregated utility function by a demand function that relates an amount of energy produced or consumed by the distributed energy resources to a price; and integrating an inverse function of the determined demand function over a range of energy produced or consumed from a minimum amount of energy to a maximum amount of energy.

19. The system of claim 12, wherein the utility function associated with the at least one distributed energy resources relates energy consumed to energy price.

20. The system of claim 12, further comprising:
the distributed energy resources comprising at least one or more of the following: a generator, an air-conditioning unit, heating unit, heating, ventilation, and air conditioning ("HVAC") system, a hot water heater, a refrigerator, a dish washer, a washing machine, a dryer, an oven, a microwave oven; pump, a home lighting system, an electrical charger, an electric vehicle charger, or a home electrical system.

21. A system comprising:

a plurality of distributed energy resources being configured to transmit a bid to at least one aggregation server, the bid representing an amount of energy to be consumed by the resource during a time period and a bid price at which the energy will be consumed;

the at least one aggregation server being configured to:
determine a utility function representing a demand curve based on the bids received at the aggregation server for the plurality of distributed energy resources by summing the received bids that have a bid price less than a market cap price for; and transmit the determined utility function to a coordination server; and the coordination server being configured to determine a clearing value based at least in part on multiple different utility functions received from multiple different aggregation servers configured to produce respective utility functions for different respective aggregated electrical loads.

* * * * *